United States Patent
Wong et al.

(10) Patent No.: US 11,808,339 B2
(45) Date of Patent: Nov. 7, 2023

(54) PULLEY ASSEMBLY FOR A SEGMENTED PULLEY TRANSMISSION AND ACTUATOR SYSTEM FOR THE SAME

(71) Applicant: INMOTIVE INC., Torontoa (CA)

(72) Inventors: Anthony Wong, Toronto (CA); Sarah Fondyga, Toronto (CA); Jack Shillinger, Toronto (CA)

(73) Assignee: INMOTIVE INC., Toronto (CA)

( * ) Notice: Subject to any disclaimer, the term of this patent is extended or adjusted under 35 U.S.C. 154(b) by 587 days.

(21) Appl. No.: 16/980,587

(22) PCT Filed: Nov. 20, 2018

(86) PCT No.: PCT/CA2018/051475
§ 371 (c)(1),
(2) Date: Sep. 14, 2020

(87) PCT Pub. No.: WO2019/173896
PCT Pub. Date: Sep. 19, 2019

(65) Prior Publication Data
US 2021/0003201 A1    Jan. 7, 2021

Related U.S. Application Data

(60) Provisional application No. 62/642,979, filed on Mar. 14, 2018.

(51) Int. Cl.
*F16H 55/12* (2006.01)
*F16H 55/17* (2006.01)
(Continued)

(52) U.S. Cl.
CPC .......... *F16H 55/12* (2013.01); *F16H 55/171* (2013.01); *F16H 9/10* (2013.01); *F16H 9/24* (2013.01)

(58) Field of Classification Search
CPC . F16H 9/24; F16H 55/52; F16H 55/56; F16H 55/54; F16H 9/10; F16H 55/12; F16H 55/171
(Continued)

(56) References Cited

U.S. PATENT DOCUMENTS 1,044,535 A * 11/1912 Kent et al. .............. F16H 55/54
474/47
1,662,037 A * 3/1928 Wichtendahl ............. F16H 9/24
474/53
(Continued)

FOREIGN PATENT DOCUMENTS

CN     102494093 A     6/2012
DE     102012008041 A1  10/2013
(Continued)

OTHER PUBLICATIONS

International Search Report and Written Opinion for PCT/CA2018/051475, dated Feb. 19, 2019, 6 pages.
(Continued)

*Primary Examiner* — Henry Y Liu
(74) *Attorney, Agent, or Firm* — Faegre Drinker Biddle & Reath LLP

(57) ABSTRACT

A pulley assembly (120) for engaging an endless member (118) includes a first pulley (124), a second pulley (126) and at least one transition segment set (128, 130) comprising one or more transition segments (152, 162a, 162b) that are independently movable between an engaged region and a disengaged region to transition the endless member (118) between the first pulley (124) and the second pulley (126). An actuator system (122) includes a support structure (220), an actuator subassembly (222, 226) secured to the support structure (220) and a stator (224, 228). The actuator subassembly (222, 226) includes a follower (250) and a sled (248), which is movable in a circumferential direction
(Continued)

between an advanced position and a retreated position, in response to an electromotive force generated on the sled (248) by the stator (224, 228). The follower engages the cam surface (262) of the sled (248) to move in an axial direction between an extended position and a retracted position as the sled (248) moves between the advanced and retreated positions.

22 Claims, 27 Drawing Sheets

(51) Int. Cl.
    *F16H 9/10*     (2006.01)
    *F16H 9/24*     (2006.01)

(58) Field of Classification Search
    USPC ................................................ 474/47, 48
    See application file for complete search history.

(56) References Cited

U.S. PATENT DOCUMENTS

| | | | | |
|---|---|---|---|---|
| 2,827,795 | A * | 3/1958 | Hector | F16H 9/24 474/134 |
| 3,861,227 | A * | 1/1975 | Hunt | B62M 9/08 474/47 |
| 4,457,739 | A * | 7/1984 | Iseman | F16H 55/54 474/69 |
| 4,634,406 | A * | 1/1987 | Hufschmid | B62M 9/08 474/49 |
| 4,850,939 | A * | 7/1989 | Chilcote | G01P 3/489 474/49 |
| 5,443,423 | A * | 8/1995 | Ha | F16H 55/52 474/49 |
| 5,637,046 | A * | 6/1997 | Ha | F16H 9/10 474/70 |
| 6,267,699 | B1 * | 7/2001 | Gruich | B62M 9/14 474/49 |
| 6,749,531 | B2 * | 6/2004 | Kang | B62M 9/08 474/47 |
| 7,713,153 | B2 * | 5/2010 | Naude | F16H 9/24 474/49 |
| 8,257,209 | B1 * | 9/2012 | Lane | F16H 9/10 474/70 |
| 8,753,236 | B2 * | 6/2014 | Wong | F16H 9/24 474/47 |
| 9,816,598 | B2 * | 11/2017 | Wong | F16H 9/06 |
| 10,988,207 | B1 * | 4/2021 | Earle | B62M 25/08 |
| 10,989,281 | B2 * | 4/2021 | Allen | B62M 9/10 |
| 11,279,441 | B2 * | 3/2022 | Zubieta Andueza | B62M 9/12 |
| 11,572,131 | B2 * | 2/2023 | Allen | B62M 25/04 |
| 11,661,145 | B2 * | 5/2023 | Schuster | B62M 9/08 477/47 |
| 2011/0045928 | A1 * | 2/2011 | Wong | F16H 9/24 474/47 |
| 2013/0267362 | A1 * | 10/2013 | Gheciu | B62M 9/105 474/164 |
| 2014/0155207 | A1 * | 6/2014 | Wong | F16H 9/24 474/163 |
| 2014/0248982 | A1 * | 9/2014 | Schuster | B62M 9/06 474/69 |
| 2014/0287855 | A1 | 9/2014 | Wong et al. | |
| 2016/0169363 | A1 | 6/2016 | Wong | |

FOREIGN PATENT DOCUMENTS

| | | |
|---|---|---|
| EP | 3251938 A1 | 12/2017 |
| FR | 429909 A | 10/1911 |
| FR | 2797670 A1 | 2/2001 |
| RU | 50269 U1 | 12/2005 |
| WO | 2005/111463 | 11/2005 |
| WO | 2012009571 | 1/2012 |

OTHER PUBLICATIONS

Supplemental European Search Report issued by the European Patent Office, dated Aug. 17, 2021, for Application No. EP18910056; 10 pages.

Patent Search Report issued by the Federal Service for Intellectual Property (ROSPATENT) Federal Institute of Industrial Property (FIPS), translated to English language, dated Nov. 11, 2021 for Application Nos. 2020133431/11 and PCT/CA2018/051475; 2 pages.

* cited by examiner

PULLEY ASSEMBLY FOR A SEGMENTED PULLEY TRANSMISSION AND ACTUATOR SYSTEM FOR THE SAME

CROSS-REFERENCE TO RELATED APPLICATION

This application claims the benefit of U.S. Provisional Patent Application No. 62/642,979 filed on Mar. 14, 2018, and entitled ELECTRICAL SYSTEM FEATURES, SPIRAL DRIVE CONFIGURATION, AND ADVANCED GEOMETRICS IN THE DESIGN OF PULLEY SEGMENTS AND SUPPORTING SURFACES IN A SYNCHRONIZED SEGMENTALLY INTERCHANGING PULLEY TRANSMISSION SYSTEM, the entirety of which is incorporated by reference.

FIELD

The subject disclosure generally relates to transmissions, and more particularly to a pulley assembly for a segmented pulley transmission and an actuator system for the same.

BACKGROUND

Transmissions are well known and can be used to change the ratio between rotating elements. Potential applications for transmissions are numerous and include motor vehicles, human-powered vehicles, maritime craft and heavy machinery, such as pumps, turbines, mixers, winches, centrifuges and shredders.

Clutchless multi-ratio transmissions allow the ratio between rotating elements to be changed while the transmission is under load. Certain mechanical problems can affect clutchless multi-ratio transmissions that limit their widespread utilization; specifically, the ability of such transmission systems to function at high speeds or under significant loads effectively and efficiently in practical applications. In addition, ratcheting, slippage, and tensioning problems can limit the commercial viability of such transmissions by decreasing their reliability, decreasing their efficiency and increasing wear. Accordingly, synchronized segmentally interchanging pulley transmission systems (SSIPTS) have been developed to reduce or alleviate at least some of these mechanical problems.

For example, U.S. Pat. No. 8,753,236 to Wong et al. discloses an SSIPTS, wherein a pulley assembly is mounted on an axle. The pulley assembly includes a core pulley having a first set of mating features on a peripheral surface thereof and a pulley segment set that comprises a number of pulley segments slidably mounted in the pulley assembly and arranged in a ring concentric with the core pulley. The pulley segments are individually actuatable into and out of the pulley assembly. The pulley segments have a second set of mating features on a peripheral surface matching the first set of mating features. An endless drive member has corresponding mating features on an inside surface for engaging the first and second sets of mating features of the core pulley and the pulley segments in an engaging position. Contact between the endless drive member and the core pulley defines a contact zone. An actuator actuates the pulley segments between the engaging and non-engaging positions when the pulley segments are outside of the contact zone.

U.S. Pat. No. 9,816,598 to Wong discloses a key pulley segment for an SSIPTS that is either first or last in a pulley segment set to engage an endless member. The first or last key segment teeth to engage or disengage the endless member, respectively, are shortened or completely trimmed, and the adjacent pulley segment to the key segment is elongated such that a portion of the tooth profile extends toward the key segment. The shortened tooth or teeth and elongated adjacent segment together allow for many pulley segments to be designed as key segments. Completely trimmed teeth may be engineered to create a supporting surface for the endless member on the key segment. The elongated adjacent segment may have an extending portion which slidably mates with the supporting surface of the key segment, thereby receiving radial support therefrom. Multiple pulley segments from different pulley segment sets may be connected or constructed to move together in a unified stack. Unified stacks may be moved by way of a cam or roller-cam system. Chassis-mounted cams engage the rollers outside of the contact zone and, via roller-arms, individual segments of a unified stack are moved into or out of engagement. Rollers may be actuated into and out of engagement with the cams by electromagnets, fixable mounted in an array.

While the contributions of known segmented pulley transmissions are laudable, improvements and alternatives are generally desired. It is therefore an object to provide a novel pulley assembly for a segmented pulley transmission and a novel actuator system for the same.

SUMMARY

It should be appreciated that this summary is provided to introduce a selection of concepts in a simplified form that are further described below in the detailed description of embodiments. This summary is not intended to be used to limit the scope of the claimed subject matter.

Accordingly, in one aspect there is provided a pulley assembly for engaging an endless member of a segmented pulley transmission, the pulley assembly comprising: a first pulley rotatable about an axis of rotation and having an outer peripheral surface for engaging the endless member; a second pulley configured to concentrically surround the first pulley and having an outer peripheral surface for engaging the endless member, the second pulley comprising a set of second pulley segments that are independently movable between an engaged region and a disengaged region; and at least one transition segment set comprising one or more transition segments that are independently movable between the engaged region and the disengaged region to transition the endless member between the first pulley and the second pulley, the at least one transition segment set defining at least one transition surface for engaging and transitioning the endless member between the first pulley and the second pulley.

In one or more embodiments, the at least one transition segment set may be interposed between the first pulley and the second pulley when located in the engaged region therewith.

In one or more embodiments, the at least one transition segment set may comprise a first transition segment set that is configured to transition the endless member from the first pulley to the second pulley and the at least one transition surface may comprise a first transition surface defined by the first transition segment set. The first transition surface may have a leading portion that is generally aligned with a first adjacent portion of the first pulley. The first transition surface may have a trailing portion that is generally aligned with a first adjacent portion of the second pulley. The first transition segment set may comprise only a single first transition segment.

In one or more embodiments, the at least one transition segment set may comprise a second transition segment set that is configured to transition the endless member from the second pulley to the first pulley and the at least one transition surface may comprise a second transition surface defined by the second transition segment set. The second transition surface may have a leading portion that is generally aligned with a second adjacent portion of the second pulley. The second transition surface may have a trailing portion that is generally aligned with a second adjacent portion of the first pulley. The second transition segment set may comprise a plurality of second transition segments.

In one or more embodiments, at least one of the transition surfaces may extend from adjacent the first pulley to adjacent the second pulley, over a partial turn about the axis of rotation. The at least one of the transition surfaces may follow a smooth generally spiral path about the axis of rotation.

In one or more embodiments, the pulley assembly may further include an actuator system coupled to the set of second pulley segments and the at least one transition segment set, wherein the actuator system is configured to independently move the set of second pulley segments and the at least one transition segment set between the engaged region and the disengaged region. The actuator system may be configured to independently move the set of second pulley segments and the at least one transition segment set between the engaged region and the disengaged region using an electromotive force.

According to another aspect, there is provided a method for shifting an endless member over a pulley assembly during rotational operation thereof, the method comprising: engaging the endless member with an origin pulley of the pulley assembly; positioning a transition segment set of the pulley assembly in an engaged region, the transition segment set extending between the origin pulley and a destination pulley of the pulley assembly; rotating the pulley assembly to engage the endless member with the transition segment set; transitioning the endless member from adjacent the origin pulley to adjacent the destination pulley, over a partial turn of the pulley assembly about an axis of rotation thereof; positioning the destination pulley in the engaged region; rotating the pulley assembly to engage the endless member with the destination pulley; disengaging the endless member from the origin pulley; and disengaging the endless member from the transition segment set.

In one or more embodiments, the step of transition the endless member may occur over only a partial turn of the pulley assembly about the axis of rotation. The transition segment set may provide support to the endless member during the step of transition the endless member from adjacent the origin pulley to adjacent the destination pulley. The destination pulley may comprise a plurality of segments circumferentially surrounding the origin pulley and positioning the destination pulley in the engaged region may comprise sequentially moving each of the segments into the engaged region while positioned in a non-contact zone of the pulley assembly. The method may further include moving the transition segment set out of the engaged region after disengaging the endless member from the transition segment set and moving a different transition segment set into the engaged region in preparation for a subsequent shift event.

In one or more embodiments, the origin pulley may comprise a plurality of segments circumferentially surrounding the destination pulley and the step of rotating the pulley assembly to engage the endless member with the transition segment set may comprise sequentially moving each of the segments out of the engaged region while positioned in a non-contact zone of the pulley assembly. The method may further include moving the transition segment set out of the engaged region after the partial turn of the pulley assembly and before a full rotation thereof.

According to another aspect, there is provided an actuator system for moving discrete rotating elements of a working system, the actuator system comprising: a support structure rotatably securable to the working system about an axis of rotation; an actuator subassembly secured to the support structure and comprising: a sled movable with respect to the support structure in a generally circumferential direction about the axis of rotation between an advanced position and a retreated position, in response to an electromotive force generated on the sled by a temporary magnetic field, the sled defining a cam surface; and a follower engageable with the cam surface to move in a generally axial direction between an extended position and a retracted position as the sled moves between the advanced position and the retreated position, the follower being securable to one or more of the discrete rotating elements of the working system; and a stator fixedly securable to the working system in a position bordering the actuator subassembly, the stator being selectively energizable to generate the temporary magnetic field to move the sled between the advanced position and the retreated position.

In one or more embodiments, the actuator subassembly may further include a backing plate positioned in proximity to the sled to increase the electromotive force generated on the sled by the temporary magnetic field. The backing plate may be secured to the support structure and may extend in the generally circumferential direction. The backing plate may pass through the sled.

In one or more embodiments, the support structure may include a pair of guides and the sled may be slidably secured therebetween to guide the sled in the generally circumferential direction as the sled moves between the advanced position and the retracted position. The sled may comprise a sled chassis and a reaction plate secured to the sled chassis, and the reaction plate may be formed of an electrically conductive but magnetically inert material to increase the electromotive force generated on the sled. The support structure may include at least one stop to arrest movement of the sled in the generally circumferential direction at the advanced and the retreated positions. The sled may comprise at least one bumper for impacting the stops to arrest the movement of the sled in the generally circumferential direction at the advanced and the retreated positions.

In one or more embodiments, the stator may comprise a stator body and at least one winding that is selectively energizable to generate the temporary magnetic field. The follower may comprise a protrusion that is engageable with the cam surface to move the follower between the extended position and the retracted position as the sled moves between the advanced position and the retreated position.

In one or more embodiments, the discrete rotating elements of the working system are segments of the set of second pulley segments and the at least one transition segment set of the pulley assembly.

According to another aspect, there is provided a method moving a discrete rotating element of a working system, the method comprising: energizing a stator to generate a temporary magnetic field; moving a sled between a retreated position and an advanced position using an electromotive force induced by the temporary magnetic field; engaging a follower with a cam surface of the sled to move the follower between an extend position and a retreated position; and securing the follower to the discrete rotating element of the working system to move the discrete element with the follower.

In one or more embodiments, the stator may be fixed to the working system, the sled and follower may be rotatable secured within the working system, and energizing the stator may comprise selectively energizing the stator as the sled rotates in proximity to the stator. The sled may move in a generally circumferential direction between the retreated position and the advanced position and the follower may move in an axial direction between the extended position and the retreated position. The method may further include increasing the electromotive force using a backing plate adjacent the sled.

According to another aspect, there is provided a segmented pulley transmission comprising: a casing; a first rotatable member secured within the casing; a pulley assembly coupled to the first rotatable member; an actuator system connected to the pulley assembly and configured to move at least one segment of the pulley assembly; a second rotatable member secured within the casing and spaced apart from the first rotatable member; and an endless member coupling the first and second rotatable members and extending therebetween.

In one or more embodiments, the housing may comprise a generally closed casing or a generally open support structure.

BRIEF DESCRIPTION OF THE DRAWINGS

Embodiments will now be described more fully with reference to the accompanying drawings, in which.

DETAILED DESCRIPTION OF EMBODIMENTS

Figure 1:
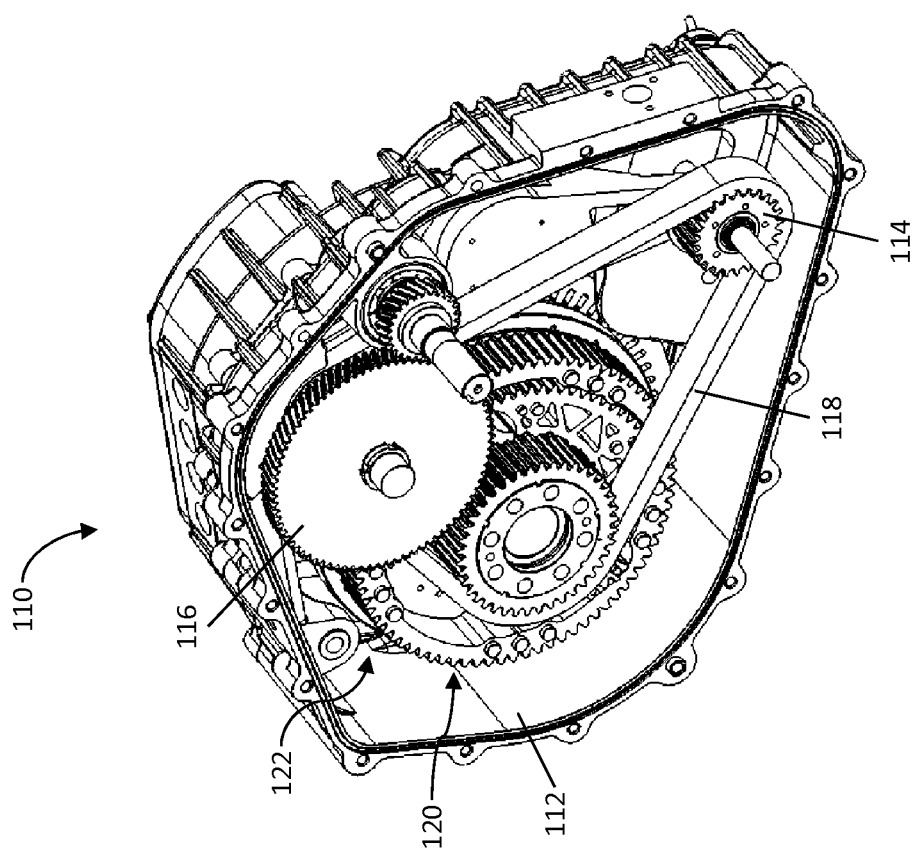
FIG. 1 is a cross-sectional view of a segmented pulley transmission.

The foregoing summary, as well as the following detailed description of certain embodiments will be better understood when read in conjunction with the accompanying drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising," "having" or "including" an element or feature or a plurality of elements or features having a particular property may further include additional elements or features not having that particular property. Also, it will be appreciated that the terms "comprises," "has" and "includes" mean "including but not limited to" and the terms "comprising," "having" and "including" have equivalent meanings.

As used herein, the term "and/or" can include any and all combinations of one or more of the associated listed elements or features.

It will be understood that when an element or feature is referred to as being "on," "attached" to, "connected" to, "coupled" with, "contacting," etc. another element or feature, that element or feature can be directly on, attached to, connected to, coupled with or contacting the other element or feature or intervening elements may also be present. In contrast, when an element or feature is referred to as being, for example, "directly on," "directly attached" to, "directly connected" to, "directly coupled" with or "directly contacting" another element of feature, there are no intervening elements or features present.

It will be understood that spatially relative terms, such as "under," "below," "lower," "over," "above," "upper," "front," "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art.

Turning now to FIG. 1, a segmented pulley transmission is shown and is generally identified by reference character 110. The segmented pulley transmission 110 in this example is a synchronized segmentally interchanging pulley transmission system (SSIPTS). The segmented pulley transmission 110 comprises a housing 112, a fixed pulley 114, an idler pulley 116, an endless member 118, a pulley assembly 120 and an actuator system 122. The segmented pulley transmission 110 may further comprise or be coupled to a driven axle and a driving axle. Although the endless member 118 in FIG. 1 is shown as a schematic representation with mating features over only a portion thereof, the endless member 118 includes mating features across the entirety of its inner surface. In other embodiments, it will be appreciated that the segmented pulley transmission 110 may include various types of endless members, such as chains or belts, with various types of mating features, such as teeth or holes.

The housing 112 at least partially surrounds the fixed pulley 114, the idler pulley 116, the endless member 118, the pulley assembly 120 and the actuator 122. In this embodiment, the housing 112 is a generally closed casing. Although, in other embodiments, the housing 112 can be a generally open support structure, such as a supportive frame. The fixed pulley 114 is rotatably secured within the housing 112 and is configured to be fixedly secured to the driven axle or the driving axle. The pulley assembly 120 is rotatably secured within the housing 112 and is configured to be fixedly secured to the other of the driven axle and the driving axle. Accordingly, the pulley assembly 120 may act as a driven pulley or a driving pulley in the segmented pulley transmission 110. In other embodiments, both the driven pulley and the driving pulley of the segmented pulley transmission 110 may both comprise a pulley assembly 120 connected to a respective actuator system 122, to provide additional ratios for the segmented pulley transmission 110. The endless member 118 engages the fixed pulley 114 and the pulley assembly 120 and rotationally couples the fixed pulley 114 and the pulley assembly 120. The endless member 118 further engages the idler pulley 116 (such as the back side of the idler pulley 116, as in FIG. 1), which is configured to take-up slack in the endless member 118. The endless member 118 rotationally couples the idler pulley 116 to the fixed pulley 114 and the pulley assembly 120. The actuator system 122 is secured within the housing 112 and is coupled to the pulley assembly 120.

Figure 2:
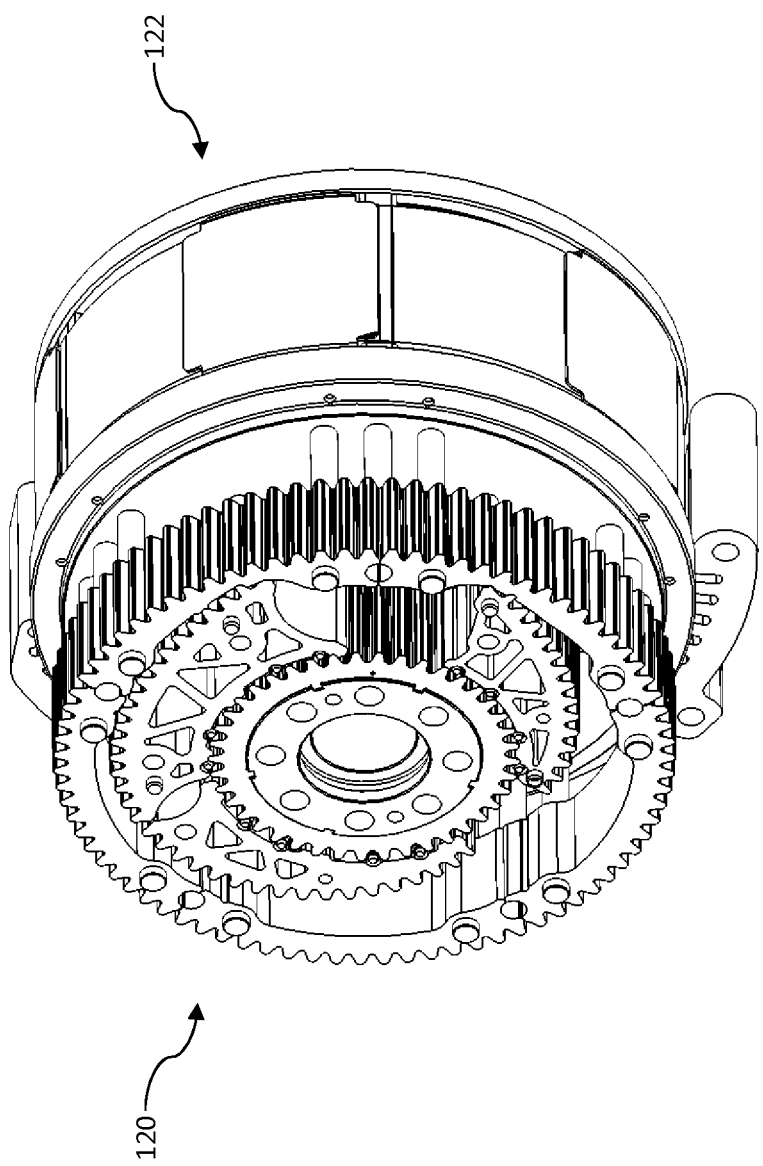
FIG. 2 is a front, right side view of a pulley assembly of the segmented pulley transmission of FIG. 1 and an actuator system for the same.

FIG. 2 shows the pulley assembly 120 and the actuator system 122 of the segmented pulley transmission 110 in isolation. The pulley assembly 120 is connected to a rotatable portion of the actuator 122 and the actuator 122 is configured to move segments of the pulley assembly 120 into and out a region where the segments will engage the endless member 118 during rotational operation, as will be described.

Figure 3:
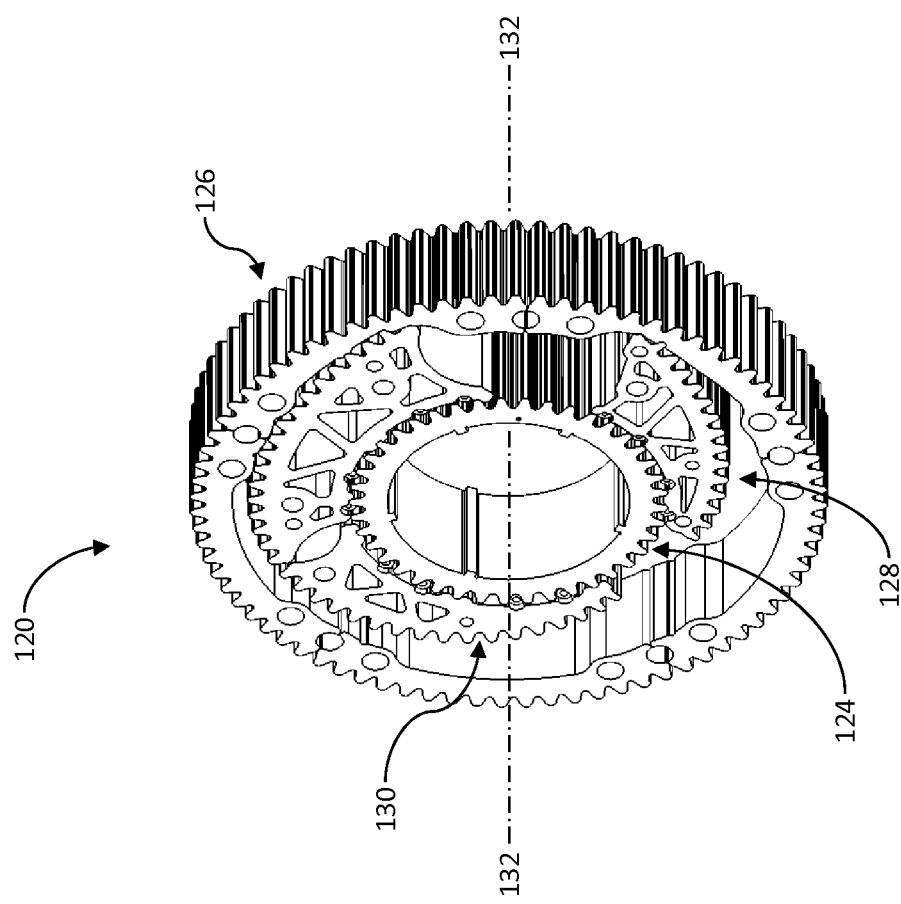
FIG. 3 is a front, right side view of the pulley assembly of FIG. 2.
Figure 4:
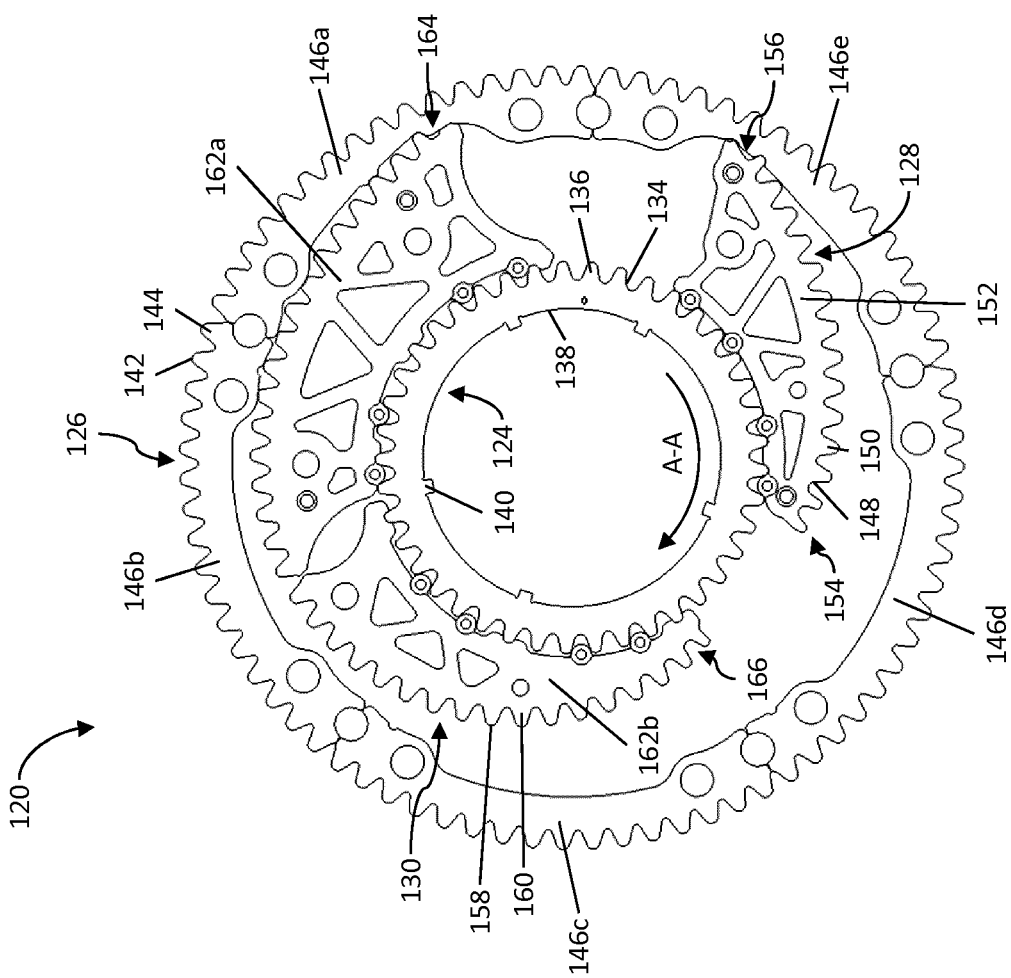
FIG. 4 is a front view of pulley assembly of FIG. 2.

FIGS. 3 and 4 show the pulley assembly 120. The pulley assembly 120 is configured to engage the endless member 118 of the segmented pulley transmission 110, during rotational operation of the pulley assembly 120 in the direction indicated by arrow A-A. The pulley assembly 120 comprises a first pulley 124, a second pulley 126, a first transition segment set 128 and a second transition segment set 130. The first pulley 124 and the second pulley 126 are configured for continuous rotational operation with the endless member 118 (i.e. during a full rotation of the pulley assembly 120, either the first pulley 124 or the second pulley 126 will continuously engage the endless member 118). In contrast, the first transition segment set 128 and the second transition segment set 130 are configured for temporary rotational operation with the endless member 118 (i.e. during a full rotation of the pulley assembly 120, neither the first transition segment set 128 nor the second transition segment set 130 will continuously engage the endless member 128). The first pulley 124 and the second pulley 126 are defined as immediate neighbours in this embodiment of the pulley assembly 120, since there are no pulleys located therebetween. That is, only the first transition segment set 128 and the second transition segment set 130 interface between the first pulley 124 and the second pulley 126, and the first transition segment set 128 and the second transition segment set 130 are not configured for continuous operation and are therefore not pulleys. The first pulley 124 in this embodiment is a core pulley of the pulley assembly 120, i.e. the centermost or smallest diameter pulley of the pulley assembly 120. Although, in other embodiments, the first pulley 124 may be another pulley of the pulley assembly 120, such as an intermediate pulley that is located between other pulleys of the pulley assembly 120.

The first pulley 124 is rotatable about and concentric with an axis of rotation of 132 of the pulley assembly 120 and is configured to engage the endless member 118 of the segmented pulley transmission 110. The first pulley 124 includes an outer peripheral surface 134 for engaging the endless member 118. The outer peripheral surface 134 is generally circular and may comprise a plurality of mating features 136, e.g. teeth, for engaging corresponding mating features on the endless member 118. The first pulley 124 further includes an inner peripheral surface 138 that is configured to be mounted on the actuator system 122, for example by press-fitting the first pulley 124 to the actuator system 122. The inner peripheral surface 138 is generally circular and may comprise a plurality of inner mating features 140, e.g. keys, for engaging corresponding mating features on the actuator system 122. Although the inner peripheral surface 138 of the first pulley 124 is configured to be mounted on the actuator system 122, it will be appreciated that in other embodiments the inner peripheral surface 138 may be configured for mounting directly on a rotatable element of the segmented pulley transmission 110, such as an axle of the segmented pulley transmission 110.

The second pulley 126 is rotatable about and concentric with the axis of rotation 132 and is configured to engage the endless member 118 of the segmented pulley transmission 110. The second pulley 126 includes an outer peripheral surface 142 for engaging the endless member 118. The outer peripheral surface 142 is generally circular and may comprise a plurality of mating features 144, e.g. teeth, for engaging corresponding mating features on the endless member 118. The second pulley 126 comprises a plurality of second pulley segments 146a to 146e. Each of the second pulley segments 146a to 146e defines a portion of the outer peripheral surface 142 and includes a subset of the plurality of mating features 144. Each of the second pulley segments 146a to 146e is configured to be coupled to the actuator 122 and is independently moveable between an engaged region and a disengaged region.

In the context of the subject disclosure, the "engaged region" is the region wherein elements of the pulley assembly 120 will engage the endless member 118 during rotational operation of the pulley assembly 120, when those elements are unsheltered or unobstructed by other elements of the pulley assembly 120. In contrast, the "disengaged region" is the region wherein elements of the pulley assembly 120 will not engage the endless member 118 during rotational operation of the pulley assembly 120, regardless of their exposure or the position of the other elements of the pulley assembly 120. Accordingly, in the subject embodiment, it will be appreciated that the first pulley 124 is permanently located within the engaged region, as the first pulley 124 is axially immovable and would always engage the endless member 118 if unobstructed by other elements during rotational operation of the pulley assembly 120. In other embodiments, the first pulley 124 may be movable between the engaged region and the disengaged region.

Accordingly, each of the second pulley segments 146a to 146e is movable to a respective engaged position, within the engaged region, wherein the segment is in-line with the endless member 118. Similarly, each of the second pulley segments 146a to 146e is movable to a respective disengaged position, within the disengaged region, wherein the segment is out-of-line with the endless member 118 and will avoid the endless member 118 during rotational operation of the pulley assembly 120. Each of the second pulley segments 146a to 146 is independently movable between their respective engaged position and their disengaged position.

The first transition segment set 128 is configured to transition the endless member 118 from engaging the first pulley 124 to engaging the second pulley 126, during rotational operation of the pulley assembly 120. During this transition, the first transition segment set 128 engages and at least partially supports the endless member 118. The first transition segment set 128 circumferentially extends only a partial turn around the axis of rotation 132. Accordingly, the first transition segment set 128 does extend the full circumference around the first pulley 124. The first transition segment set 128 is between the first pulley 124 and the second pulley 126 and includes a first transition surface 148, for engaging the endless member 118 of the segmented pulley transmission 110 and transitioning the endless member 118 from the first pulley 124 to the second pulley 126. The first transition surface 148 may comprise a plurality of mating features 150, e.g. teeth, for engaging corresponding mating features on the endless member 118. The first transition segment set 128 comprises a single first transition segment 152. The first transition segment 152 defines the first transition surface 148. The first transition segment 152 is independently moveable between the engaged region and the disengaged region, and is interposed between the first pulley 124 and the second pulley 126 when located in the engaged region therewith. Accordingly, the first transition segment 152 has an engaged position, within the engaged region, wherein the first transition segment 152 is in-line with the endless member 118. Similarly, the first transition segment 152 is movable to a respective disengaged position, within the disengaged region, wherein the first transition segment 152 is out-of-line with the endless member 118 and will avoid the endless member 118 during rotational operation of the pulley assembly 120. The first transition segment 152 is independently movable between its respective engaged position and disengaged position.

The first transition surface 148 follows a smooth, generally spiral path about the axis of rotation 132. In the subject embodiment, the path of the first transition surface 148 follows a continually increasing radius over the circumferential length of the first transition surface 148. The first transition surface 148 extends from adjacent the first pulley 124 to adjacent the second pulley 126, over only a partial turn about the axis of rotation 132, and is configured to prolong the transition of the endless member 118 from the first pulley 124 to the second pulley 126. As will be appreciated, prolonging this transition can reduce the intermittent forces generated during the transition and can result in a smoother transition of the endless member 118 between the pulleys 124, 126. The first transition surface 148 includes a leading portion 154 and a trailing portion 156. The leading portion 154 is configured to initially engage the endless member 118 when transitioning the endless member 118 from the first pulley 124 to the second pulley 126, and the trailing portion 156 is configured to lastly engage the endless member 118 when transitioning the endless member 118 from the first pulley 124 to the second pulley 126. Accordingly, the leading portion 154 of the first transition surface 148 is generally aligned with an adjacent portion of the outer peripheral surface 134 of the first pulley 124, such as a rotationally preceding portion of the outer peripheral surface 134 of the first pulley 124. Whereas, the trailing portion 156 of the first transition surface 148 is generally aligned with an adjacent portion of the outer peripheral surface 142 of the second pulley 126, such as the portion of the outer peripheral surface 142 defined by a rotationally following second pulley segment 146a. As will be appreciated, the rotationally following second pulley segment 146a is the initial segment of the second pulley 126 to engage the endless member 118 of the segmented pulley transmission 110 during a transition of the endless member 118 from the first pulley 124 to the second pulley 126.

In the context of the subject disclosure, it will be appreciated that a "smooth" path is one that will not cause the endless member 118 to bend beyond a designated amount. The designated amount may be the maximum permissible bend angle between links in the endless member, when the endless member is a chain for example, or may be a minimum permissible bend radius, when the endless member is a belt for example. Similarly, it will be appreciated that in the context of the subject disclosure, a surface or a portion thereof is "generally aligned" with another when arranged such that the endless member 118 forms a transition when engaged therebetween that does not cause the endless member 118 to bend beyond the designated amount.

The second transition segment set 130 is configured to transition the endless member 118 from engaging the second pulley 126 to engaging the first pulley 124, during rotational operation of the pulley assembly 120. During this transition, the second transition segment set 130 engages and at least partially supports the endless member 118. The second transition segment set 130 circumferentially extends only a partial turn around the axis of rotation 132. Accordingly, the second transition segment set 130 does extend the full circumference around the first pulley 124. The second transition segment set 130 is between the first pulley 124 and the second pulley 126 and includes a second transition surface 158, for engaging the endless member 118 of the segmented pulley transmission 110 and transitioning the endless member 118 from the second pulley 126 to the first pulley 124. The second transition surface 158 may comprise a plurality of mating features 160, e.g. teeth, for engaging corresponding mating features on the endless member 118. The second transition segment set 130 comprises a pair of second transition segments 162a, 162b. Each of the second transition segments 162a, 162b defines a portion of the second transition surface 158. Each of the second transition segments 162a, 162b is independently moveable between the engaged region and the disengaged region. The second transition segments 162a, 162b are interposed between the first pulley 124 and the second pulley 126 when located in the engaged region therewith. Accordingly, each of the second transition segments 162a, 162b is movable to a respective engaged position, within the engaged region, wherein the segment is in-line with the endless member 118. Similarly, each of the second transition segments 162a, 162b is movable to a respective disengaged position, within the disengaged region, wherein the segment is out-of-line with the endless member 118 and will avoid the endless member 118 during rotational operation of the pulley assembly 120. Each of the second transition segments 162a, 162b is independently movable between their respective engaged position and their disengaged position.

The second transition surface 158 follows a smooth, generally spiral path about the axis of rotation 132. In the subject embodiment, the path of the second transition surface 158 follows a continually decreasing radius over the circumferential length of the second transition surface 158. The second transition surface 158 extends from adjacent the second pulley 126 to adjacent the first pulley 124, over only a partial turn about the axis of rotation 132, and is configured to prolong the transition of the endless member 118 from the second pulley 126 to the first pulley 124. As will be appreciated, prolonging this transition can reduce the intermittent forces generated during the transition and can result in a smoother transition of the endless member 118 between the pulleys 124, 126. The second transition surface 158 includes a leading portion 164 and a trailing portion 166. The leading portion 164 is configured to initially engage the endless member 118 when transitioning the endless member 118 from the second pulley 126 to the first pulley 124, and the trailing portion 166 is configured to lastly engage the endless member 118 when transitioning the endless member 118 from the second pulley 126 to the first pulley 124. Accordingly, the leading portion 164 of the second transition surface 158 is generally aligned with an adjacent portion of the outer peripheral surface 142 of the second pulley 126, such as the portion of the outer peripheral surface 142 defined by the rotationally preceding second pulley segment 146e, and the trailing portion 166 of the second transition surface 158 is generally aligned with an adjacent portion of the outer peripheral surface 134 of the first pulley 124, such as a rotationally trailing portion of the outer peripheral surface 134 of the first pulley 124. As will be appreciated, the rotationally preceding second pulley segment 146e is the last pulley segment of the second pulley 126 to disengage the endless member 118 of the segmented pulley transmission 110 during a transition of the endless member 118 from the second pulley 126 to the first pulley 124.

During rotational operation of the pulley assembly 120, the second pulley segments 146a to 146e, the first transition segment 152 and the second transition segments 162a, 162b can be moved by the actuator system 122 into and/or out of the engaged region to adjust the ratio of the segmented pulley transmission 110 while under load, as will be described herein.

Figure 5:
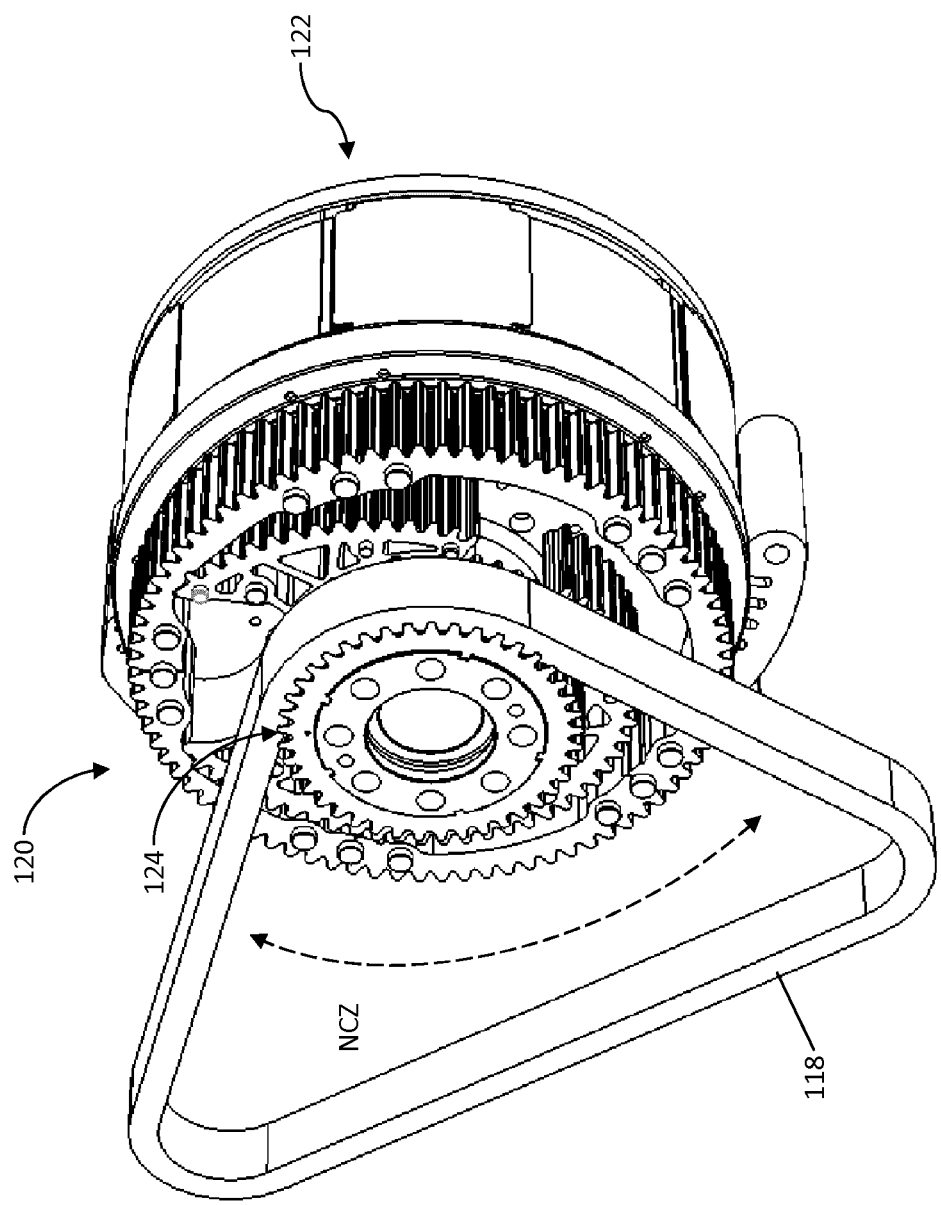
FIG. 5 is a front, right side view of the pulley assembly and actuator system of FIG. 2, showing an endless member engaged with a first pulley.

FIG. 5 shows the pulley assembly 120, the actuator system 122 and a schematic representation of the endless member 118. The endless member 118 is engaged with the first pulley 124 of the pulley assembly 120. It will be appreciated that the endless member 118 may further engage additional elements of the segmented pulley transmission 110, such as the fixed pulley 114 and the idler pulley 116 (not shown in FIG. 5). It will also be appreciated that although the schematic representation of the endless member 118 is only shown with mating features on a portion thereof, the endless member 118 includes mating features across the entirety of its inner surface.

During rotational operation of the pulley assembly 120, the endless member 118 will contact and engage the pulley assembly 120 within an angular region defined as the contact zone. Conversely, the endless member 118 will not contact or engage the pulley assembly 120 within an angular region defined as the non-contact zone (NCZ). Accordingly, the pulley/transition segments 146a to 146e, 152, 162a, 162b of the pulley assembly 120 can be moved into or out of the engaged region while positioned in the non-contact zone without interfering with the endless member 118 and while the segmented pulley transmission 110 is under load. As will be appreciated, the non-contact zone will vary depending on which pulley/transition segments of the pulley assembly 120 are engaged with the endless member 118.

By sequentially moving pulley/transition segments of the pulley assembly 120 into or out of the engaged region while positioned in the non-contact zone, the endless member 118 can be transitioned from engaging one of the pulleys in the pulley assembly 120, an "origin pulley," to engaging another of the pulleys in the pulley assembly 120, a "destination pulley," without interrupting continuous rotational operation of the segmented pulley transmission 110 and without interrupting the load on the segmented pulley transmission 110. In the subject embodiment, the origin pulley can be the first pulley 124 and the destination pulley 126 can be the second pulley 126, or vice versa.

Transitioning the endless member 118 from the origin pulley to the destination pulley is generally referred to as a "shift event." A shift event resulting in a higher ratio between the driven pulley and the driving pulley of the segmented pulley transmission 110 is known as an "upshift event." A shift event resulting in a lower ratio between the driven pulley and the driving pulley of the segmented pulley transmission 110 is known a "downshift event." During a shift event, the endless member 118 will sequentially engage the origin pulley, one of the transition segment sets and the destination pulley. The time period over which the endless member 118 transitions from engaging only the origin pulley to engaging only the destination pulley is known as the transition period, and the number of degrees through which the pulley assembly 120 rotates during the transition period is known as the transition range. As will be appreciated, the transition segment sets 128, 130 provide support for the endless member 118 during at least a portion of the shift event. Accordingly, including the transition segments sets in a shift event can increase the transition period and the transition range for that shift event, which can help to reduce forces caused by the shift event and can help to smooth the transition of the endless member 118 between origin pulley and the destination pulley.

FIGS. 6a to 6g show a sequence for a shift event that transitions the endless member 118 from engaging the first pulley 124 to engaging the second pulley 126, during rotational operation of the pulley assembly 120. As will be appreciated, the endless member 118 is hidden in these figures for visibility. Prior to the shift event, the endless member 118 is engaged with the first pulley 124, as shown in FIG. 5. Accordingly, the second pulley segments 146a to 146e, the first transition segment 152 and the second transition segments 162a, 162b are all in the disengaged region.

Figure 6A:
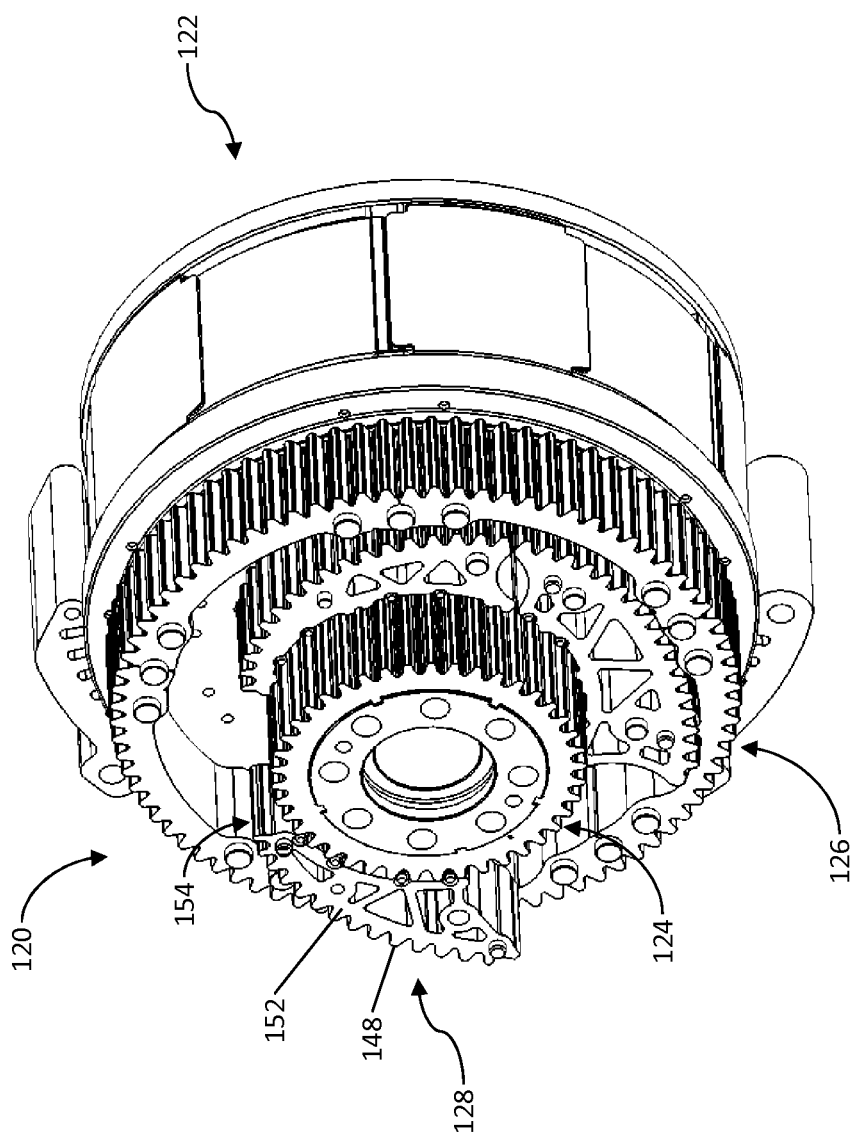
FIGS. 6a to 6g are front, right side views of the pulley assembly and actuator system of FIG. 2 showing a sequence for transitioning the endless member from the first pulley to a second pulley.

At the step shown in FIG. 6a, the first transition segment 152 is moved into the engaged region while positioned in the non-contact zone of the pulley assembly 120. As the pulley assembly 120 rotates, the first transition segment 152 will enter into the contact zone and will engage the endless member 118 with the first transition surface 148. The leading portion 154 of the first transition surface 148 will initially engage the endless member 118 to smoothly transition the endless member 118 from the first pulley 124 to the first transition segment set 128. As the pulley assembly 120 further rotates, the remainder of the first transition surface 148 will engage the endless member 118 to smoothly transition the endless member 118 from adjacent the first pulley 124 to adjacent the second pulley 126.

Figure 6B:
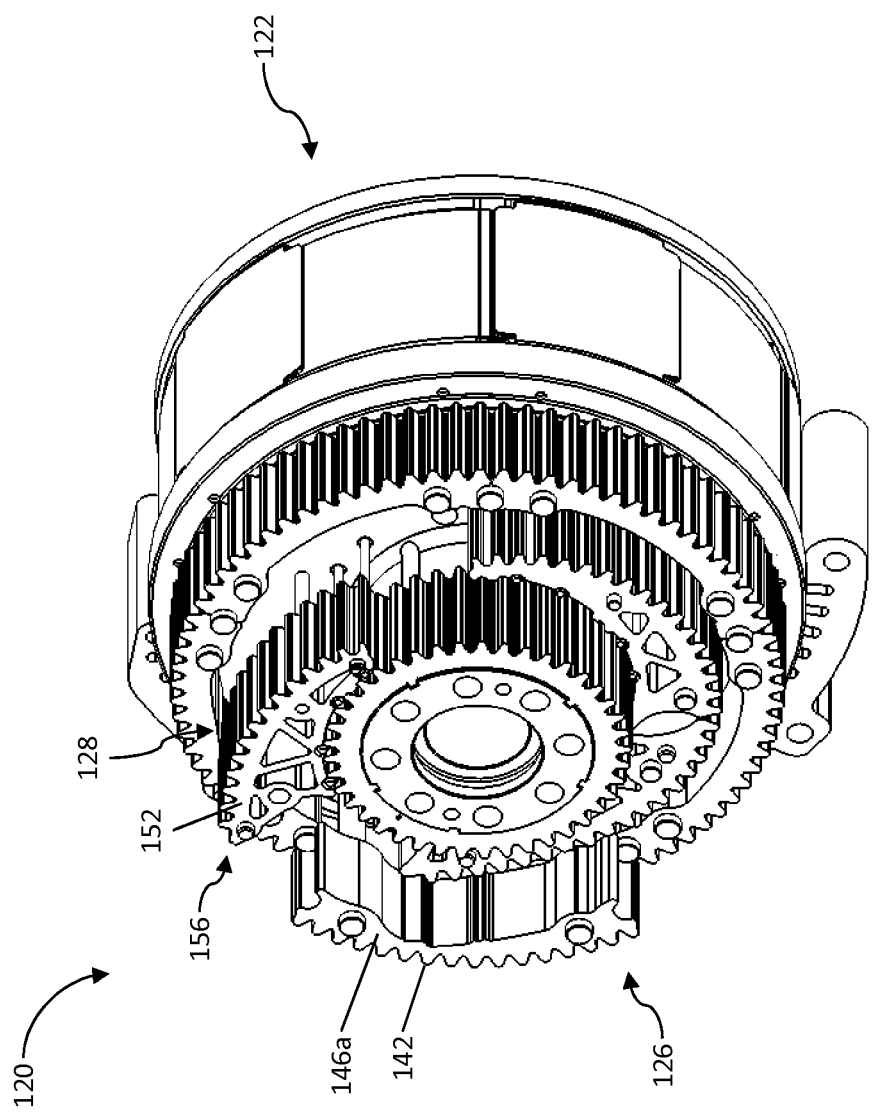
Figure 6C:
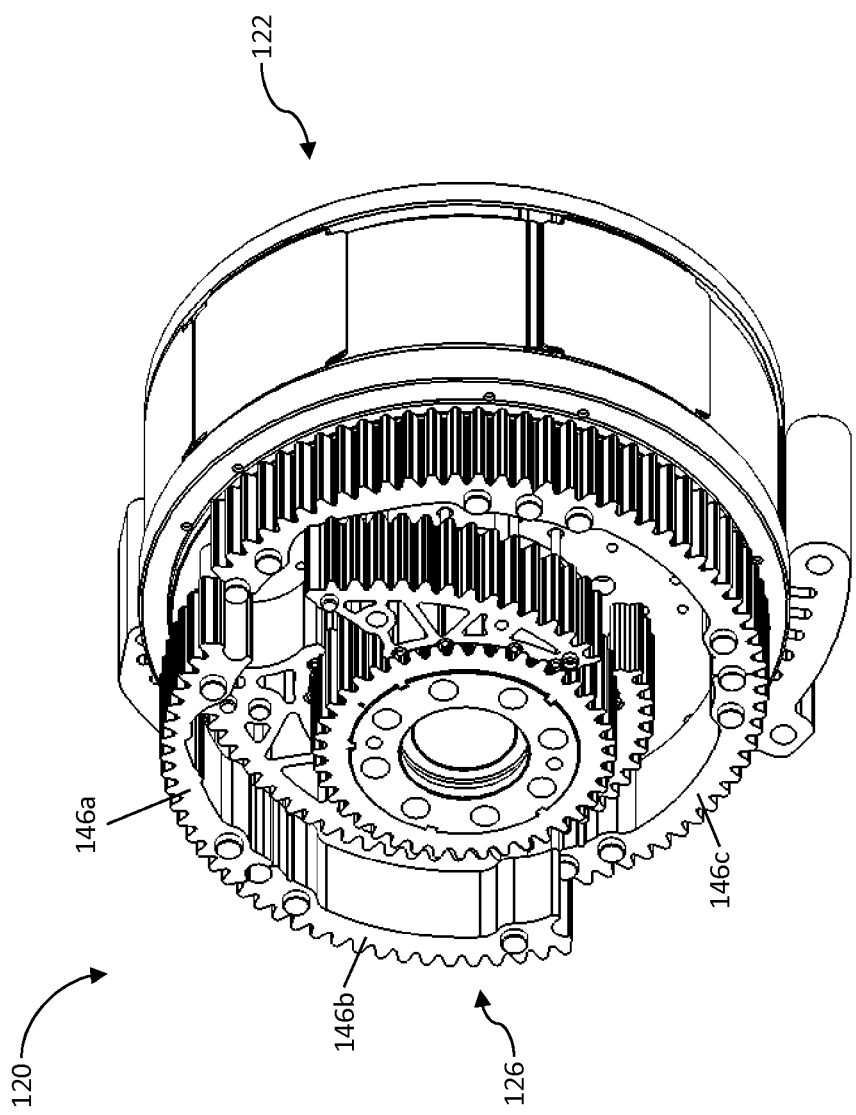
Figure 6D:
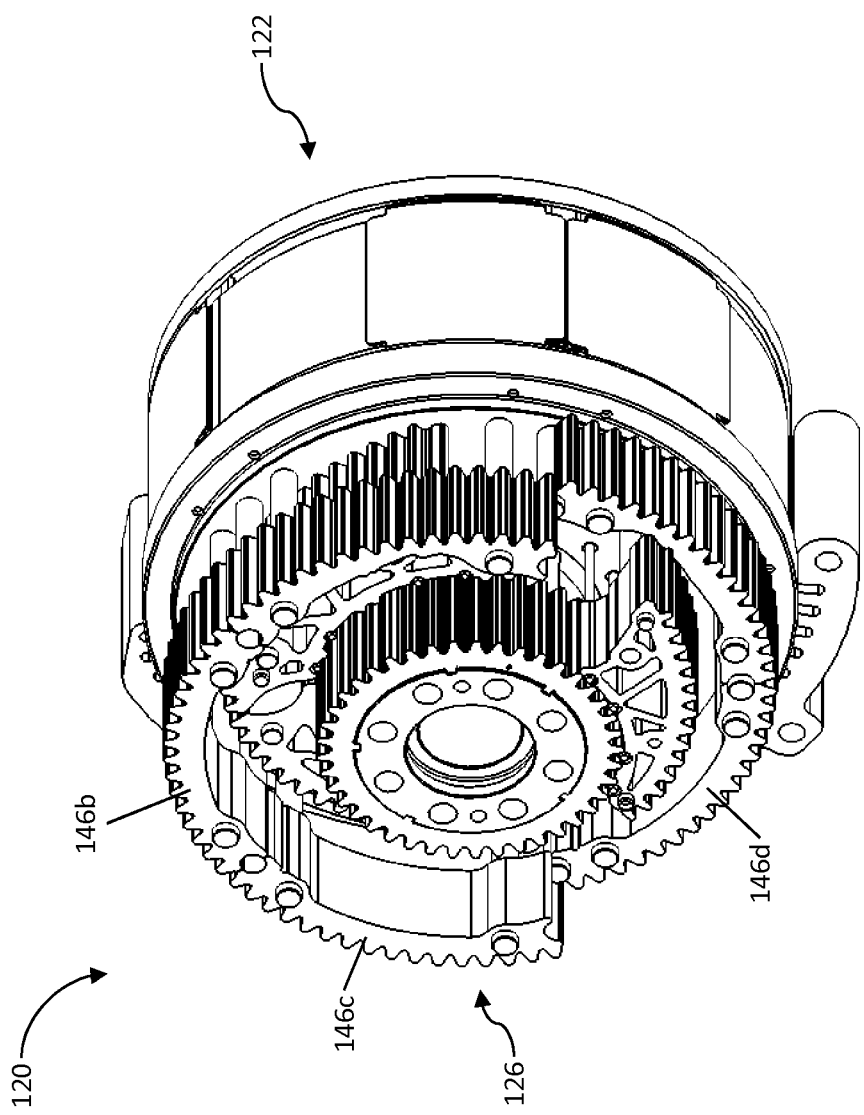
Figure 6E:
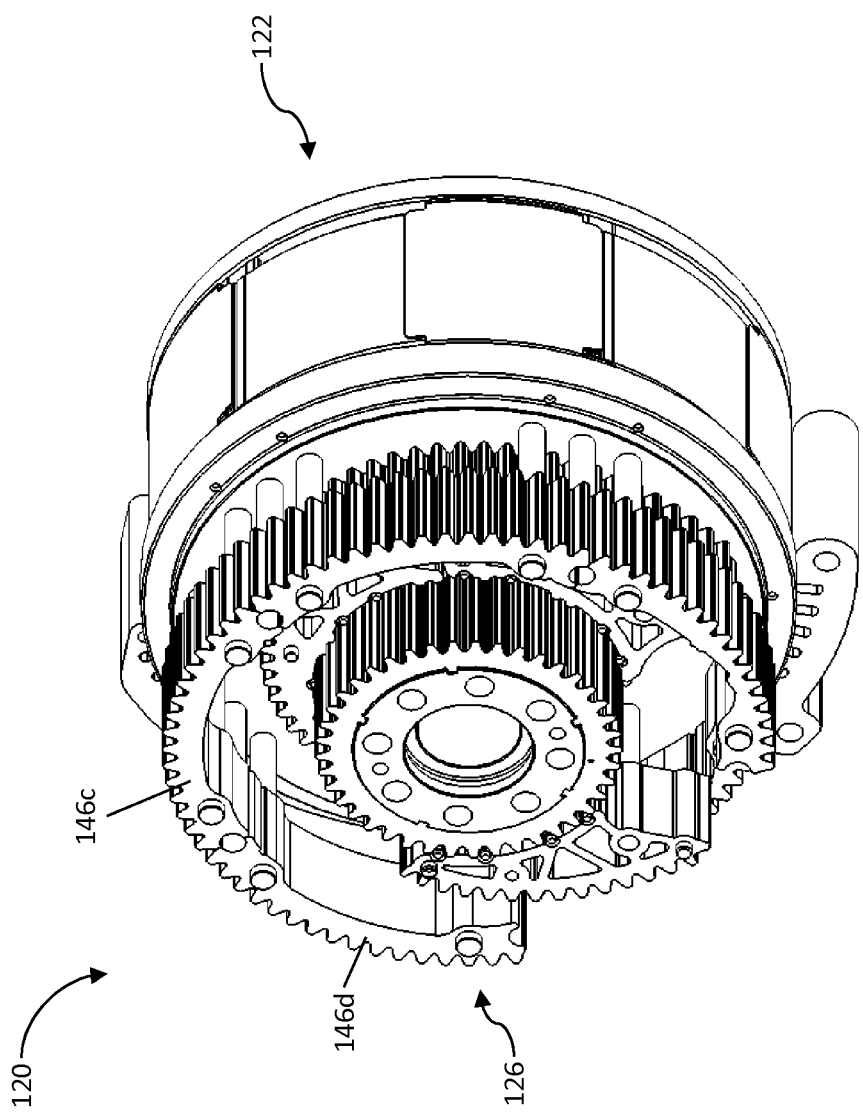
Figure 6F:
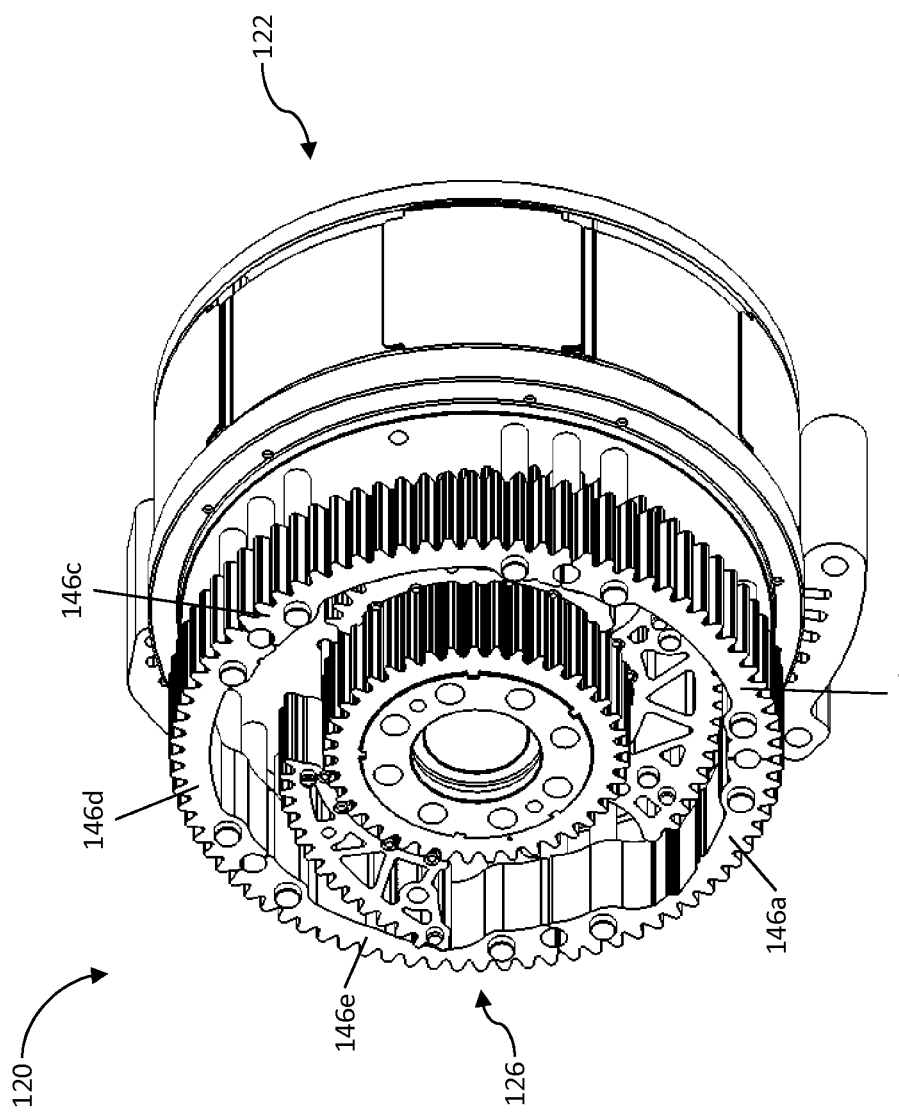

At the step shown in FIG. 6b, the second pulley segment 146a is moved into the engaged region while positioned in the non-contact zone of the pulley assembly 120. As the pulley assembly 120 rotates, the second pulley segment 146a will rotationally follow the first transition segment 152 into the contact zone and will engage the endless member 118. The outer peripheral surface 142 defined by the second pulley segment 146a will engage the endless member 118 following the trailing portion 156 of the first transition segment 152 to smoothly transition the endless member 118 from the first transition segment set 128 to the second pulley segment 146a of the second pulley 126.

Figure 7:
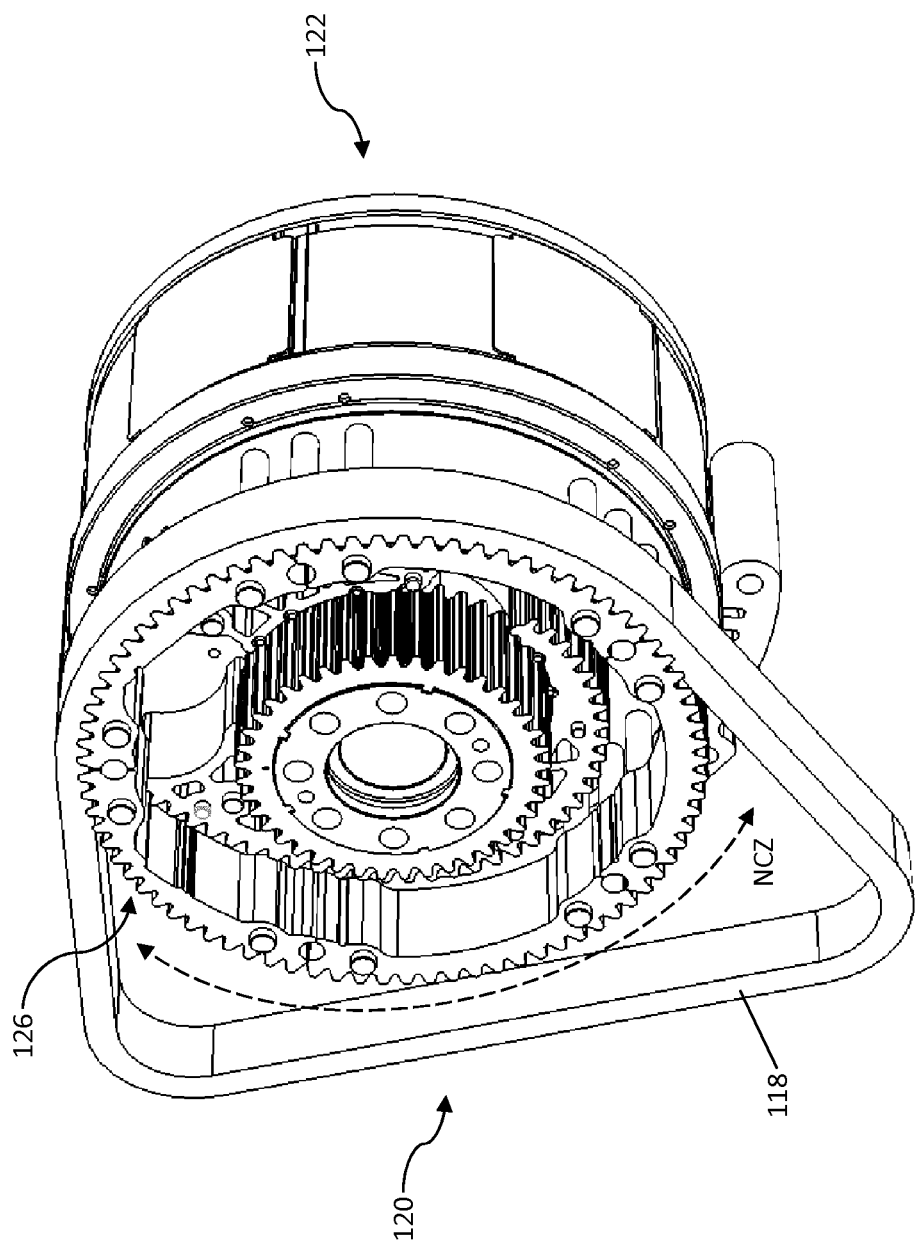
FIG. 7 is a front, right side view of the pulley assembly and actuator system of FIG. 2, showing the endless member engaged with the second pulley.

At the steps shown in FIGS. 6c to 6f, the remaining second pulley segments 146b to 146e are sequentially moved into the engaged region while individually positioned in the non-contact zone of the pulley assembly 120. As the pulley assembly 120 rotates, the remaining second pulley segments 146b to 146e will rotationally follow the second pulley segment 146a into the contact zone and will engage the endless member 118. Once all of the second pulley segments 146a to 146e are in the engaged region, the pulley assembly 120 can operate continuously with the endless member 118 engaging the second pulley 126 only and the shift event from the first pulley 124 to the second pulley 126 is complete. Subsequent to the shift event, the endless member 118 will be engaged with the second pulley 126, as shown in FIG. 7. Optionally, the shift event may include further steps, such as steps in preparation for the next shift event.

Figure 6G:
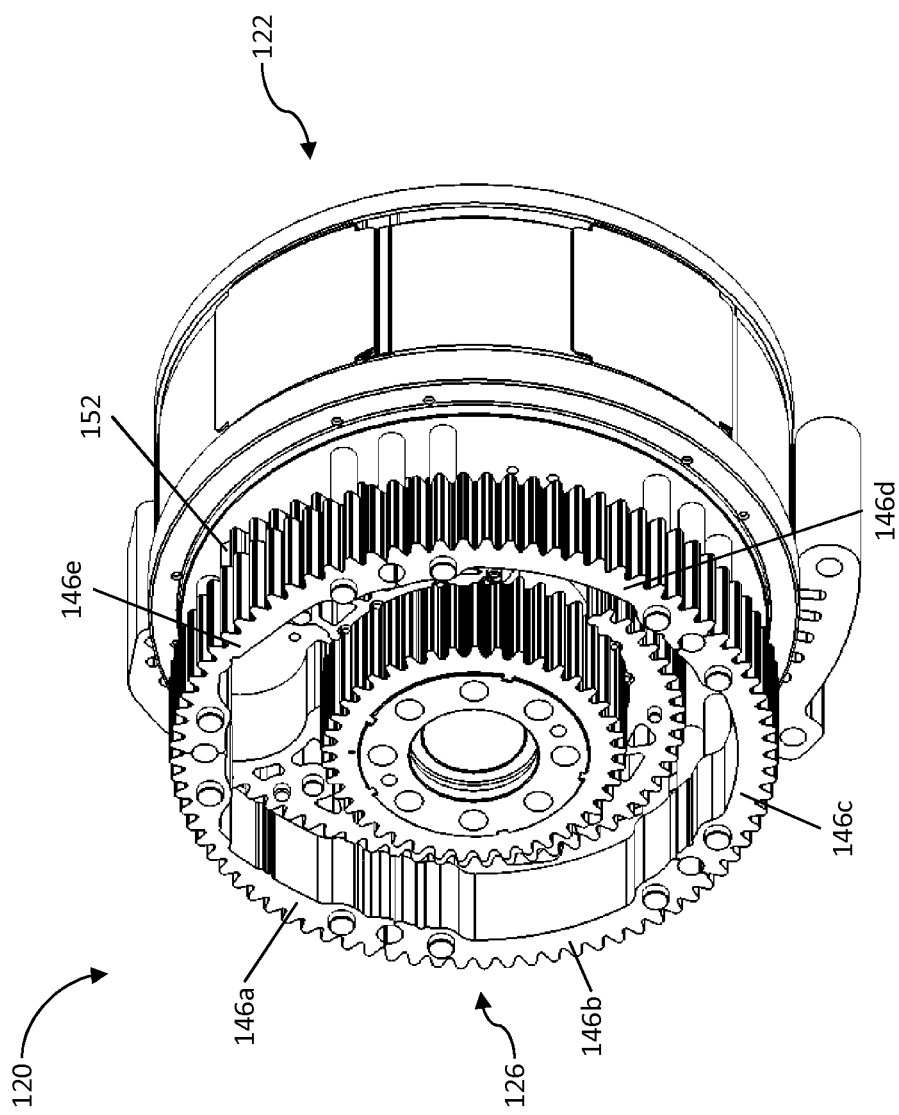

At the step shown in FIG. 6g, the first transition segment 152 is moved out of the engaged region. This step may be done in preparation for a subsequent shift event, or may be done as part of the aforementioned shift event. In the subject embodiment, the first transition segment 152 is moved out of the engaged region while positioned in the non-contact zone. In other embodiments, the first transition segment 152 may be moved out of the engaged region while positioned in the contact zone or while bridging the contact zone and the non-contact zone, since the first transition segment 152 is sheltered or obstructed by the second pulley 126 while in the contact zone and will not engage or interfere with the endless member 118. As will be appreciated, this step may occur as soon as the first transition segment 152 is rotated out of engagement with the endless member 118. Accordingly, this step may occur before the steps shown in FIGS. 6c to 6f are complete or may occur thereafter.

As will be appreciated, during the shift event, the endless member 118 may simultaneously engage all three of the first pulley 124, the second pulley 126 and the first transition segment set 128, or the endless member 118 may only simultaneously engage the first transition segment set 128 and one of the first pulley 124 and the second pulley 126. As will also be appreciated, the steps of the shift event shown in FIGS. 6a to 6g may occur entirely consecutively without any overlap, or may partially overlap in time.

FIG. 7 shows the pulley assembly 120, the actuator system 122 and the schematic representation of the endless member 118 from FIG. 5. The endless member 118 is engaged with the second pulley 126 of the pulley assembly 120.

FIGS. 8a to 8i show a sequence for a shift event that transitions the endless member 118 from engaging the second pulley 126 to engaging the first pulley 124, during rotational operation of the pulley assembly 120. As will be appreciated, the endless member 118 is hidden in these figures for visibility. Prior to the shift event, the endless member 118 is engaged with the second pulley 126, as shown in FIG. 7. Subsequent to the shift event, the endless member 118 will be engaged with the first pulley 124, as shown in FIG. 5. During the shift event, the endless member 118 may simultaneously engage all three of the first pulley 124, the second pulley 126 and the second transition segment set 130, or the endless member 118 may only simultaneously engage the second transition segment set 130 and one of the first pulley 124 and the second pulley 126. As will be appreciated, the steps of the shift event shown in FIGS. 8a to 8i may occur entirely consecutively without any overlap, or may partially overlap in time.

Figure 8A:
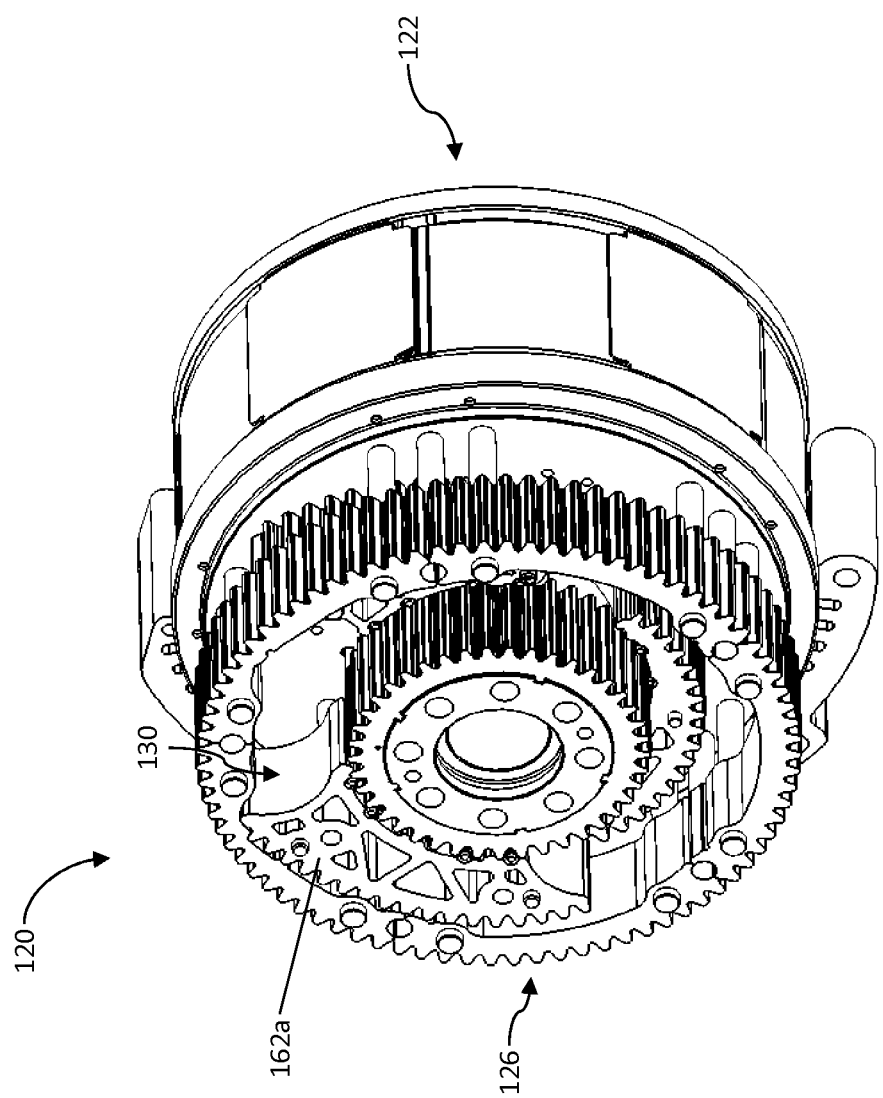
FIGS. 8a to 8i are front, right side views of the pulley assembly and actuator system of FIG. 2 showing a sequence for transitioning the endless member from the second pulley to the first pulley.
Figure 8B:
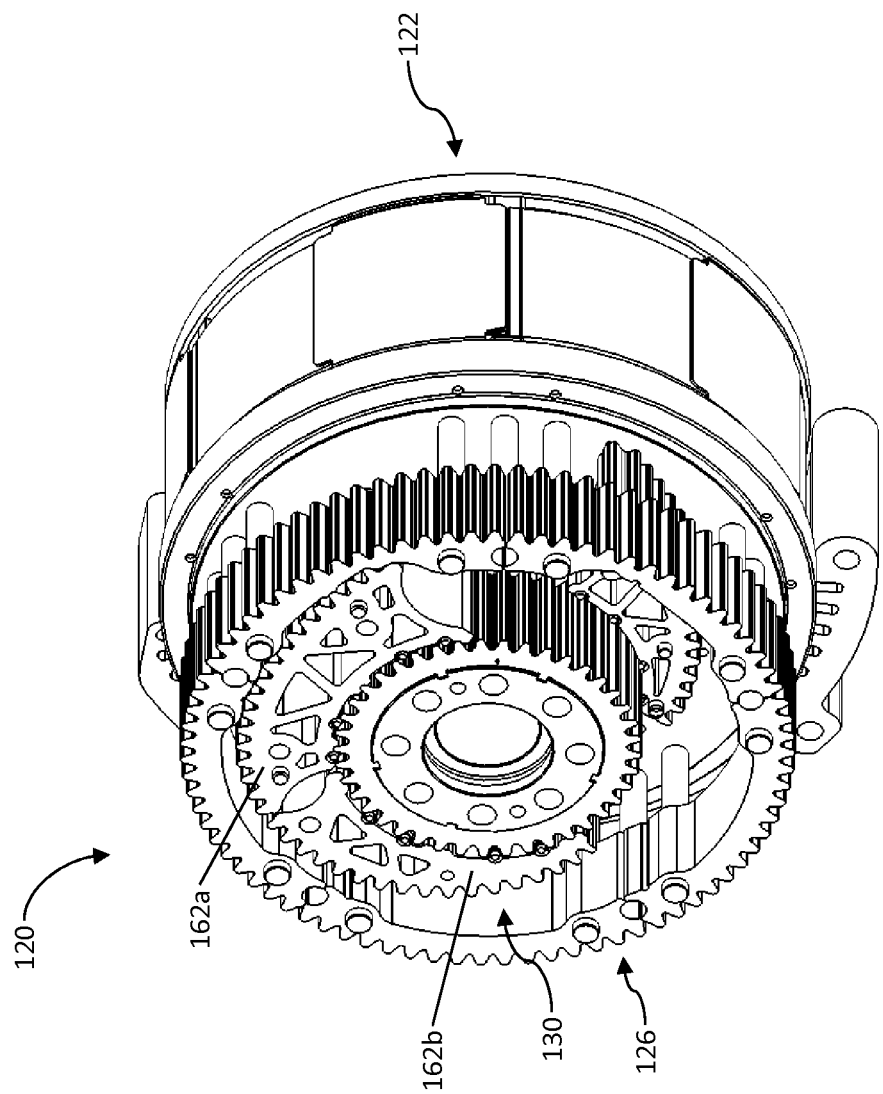
Figure 8C:
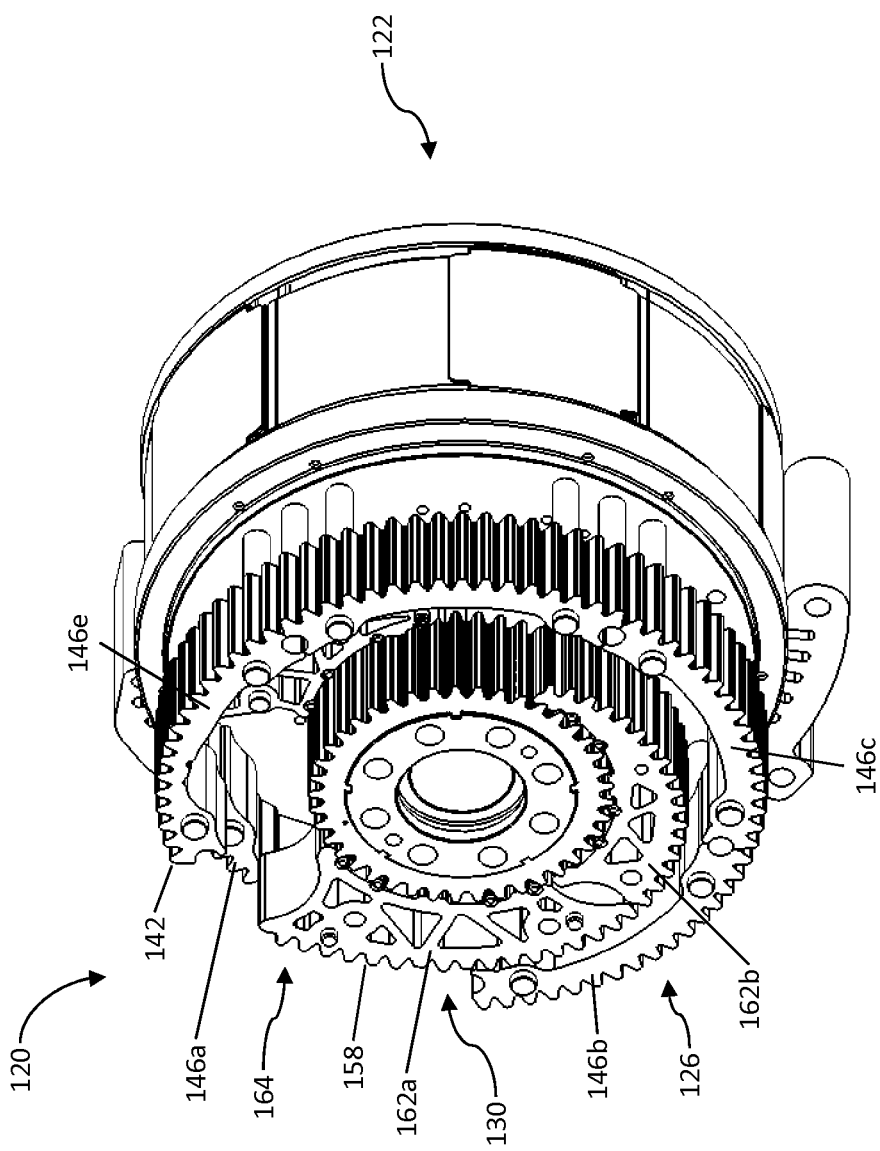
Figure 8D:
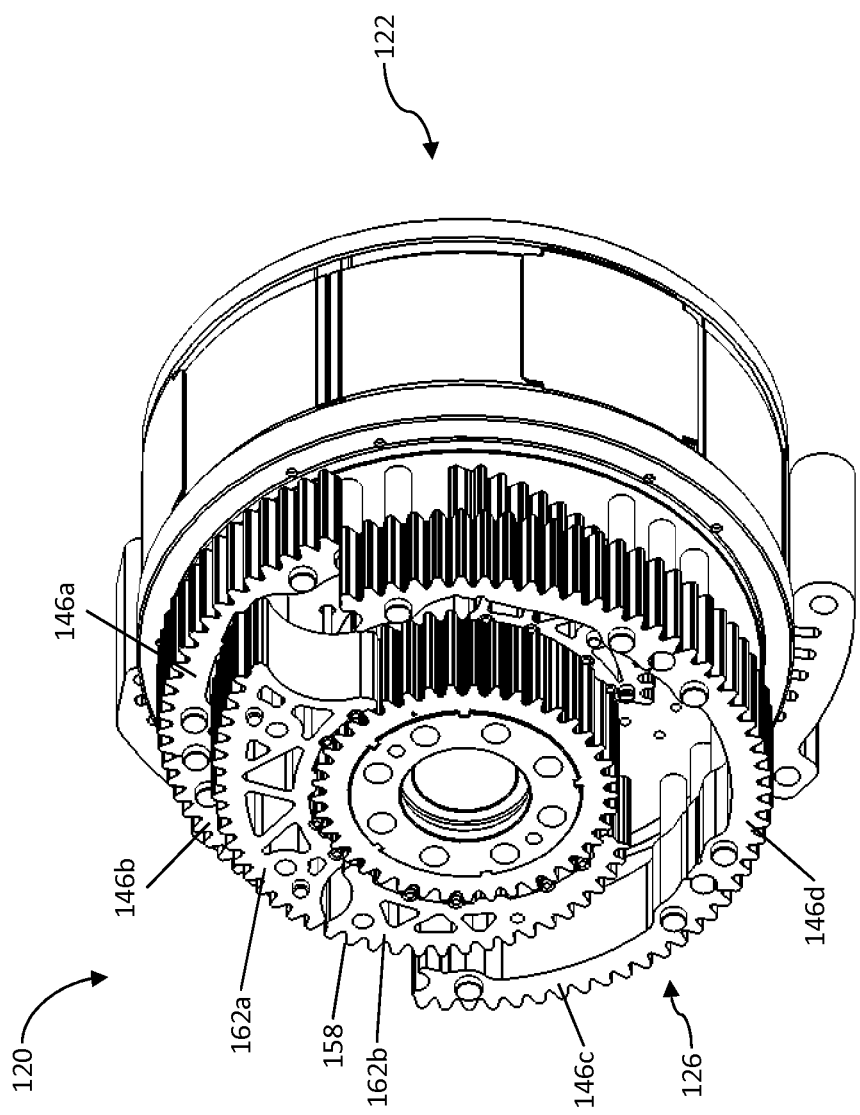
Figure 8E:
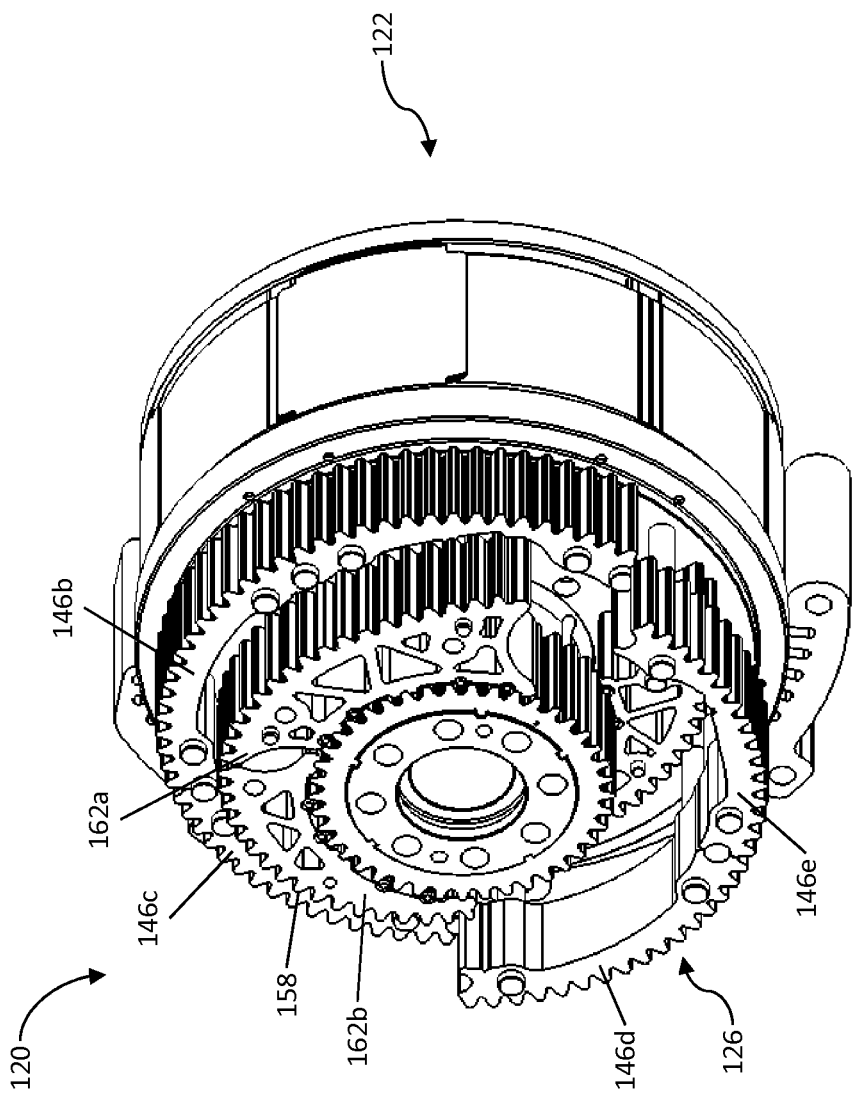
Figure 8F:
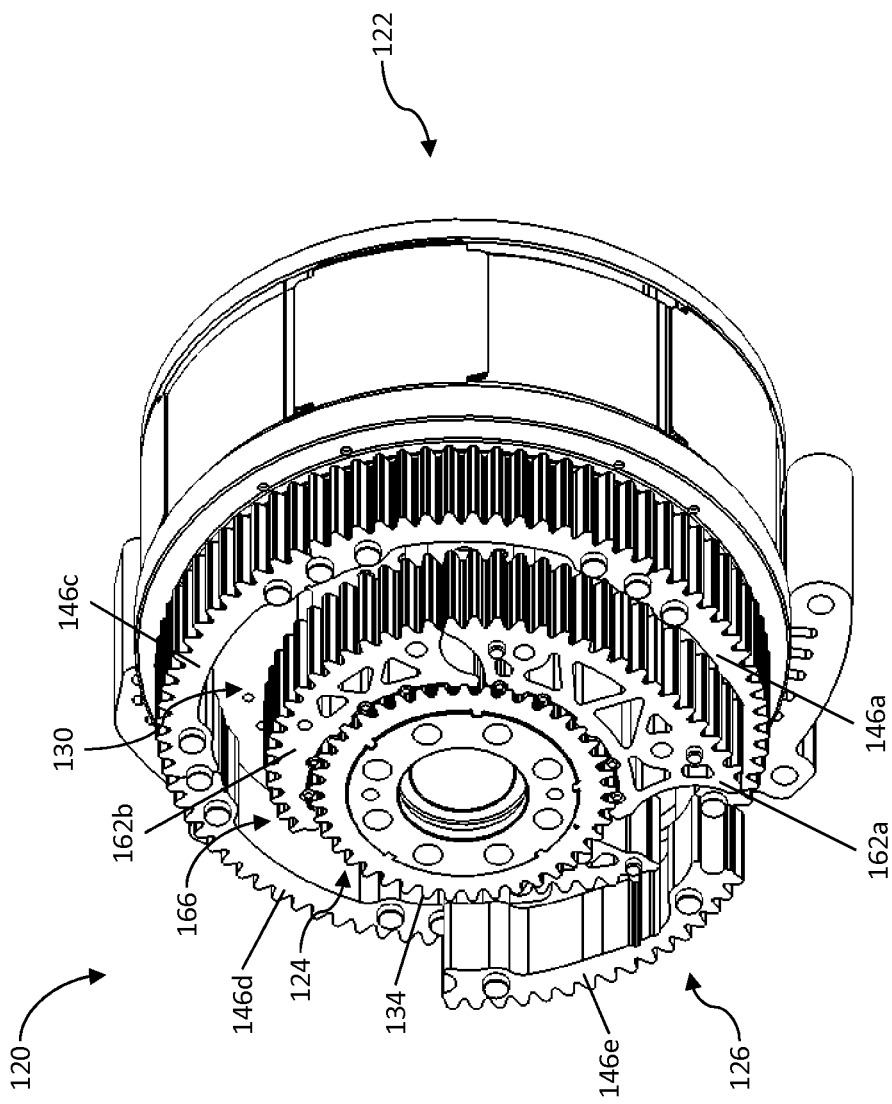
Figure 8G:
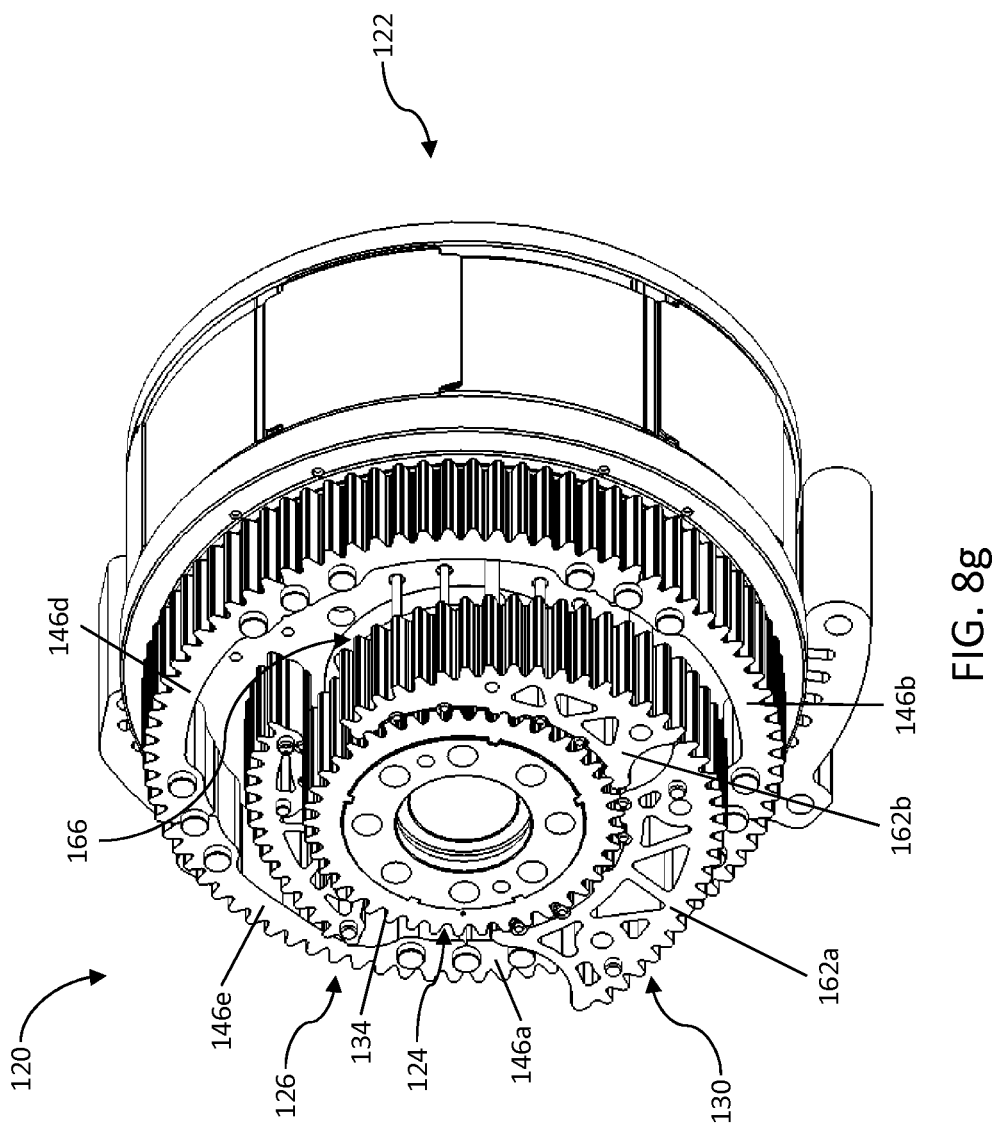

At the steps shown in FIGS. 8a and 8b, the second transition segments 162a, 162b are sequentially moved into the engaged region. As will be appreciated, in other embodiments, the second transition segments 162a, 162b may be moved into the engaged region concurrently. The steps shown in FIGS. 8a and 8b may be done as part of the shift event from the second pulley 126 to the first pulley 124 as described herein, or may be done in preparation for and prior to that shift event. In the subject embodiment, the second transition segments 162a, 162b are moved into the engaged region while positioned in the contact zone or while bridging the contact zone and the non-contact zone, since the second transition segments 162a, 162b are sheltered or obstructed by the second pulley 126 while in the contact zone and will not engage or interfere with the endless member 118.

At the steps shown in FIGS. 8c to 8g, the second pulley segments 146a to 146e are sequentially moved out of the engaged region while individually positioned in the non-contact zone of the pulley assembly 120. Accordingly, as the pulley assembly 120 rotates, the second pulley segments 146a to 146e will avoid and will not engage the endless member 118. Instead, the second transition segments 162a, 162b of the second transition segment set 130 will enter into the contact zone and will engage the endless member 118. The leading portion 164 of the second transition surface 158 will initially engage the endless member 118 following the portion of the outer peripheral surface 142 defined by the second pulley segment 146e, to smoothly transition the endless member 118 from the second pulley 126 to the second transition segment set 130. As the pulley assembly 120 further rotates, the remainder of the second transition surface 158 will engage the endless member 118 to smoothly transition the endless member 118 from adjacent the second pulley 126 to adjacent the first pulley 124. As the pulley assembly 120 still further rotates, the first pulley 124 will engage the endless member 118. The portion of the outer peripheral surface 134 of the first pulley 124 that rotationally follows the second transition segment set 130 will initially engage the endless member 118 following the trailing portion 166 of the second transition surface 158 to smoothly transition the endless member 118 from the second transition segment set 130 to the first pulley 124.

Figure 8H:
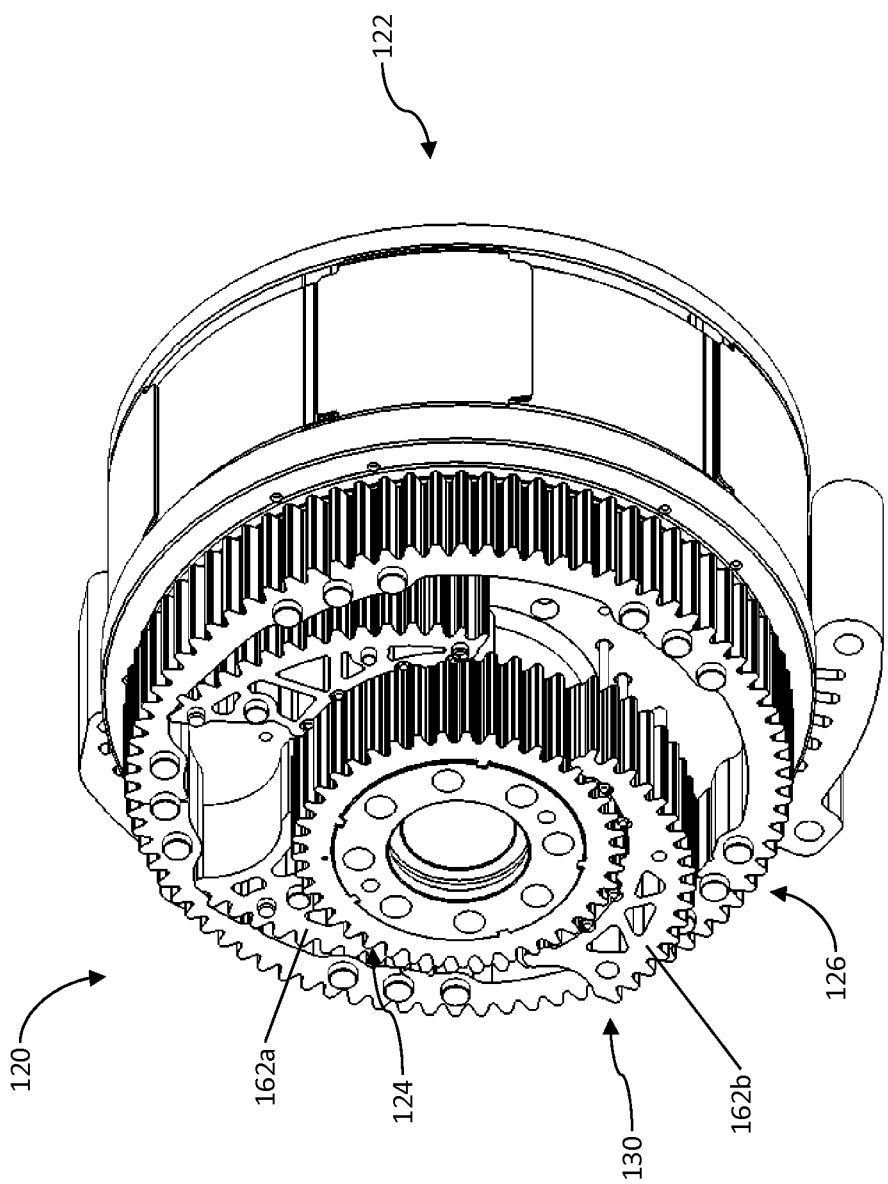
Figure 8I:
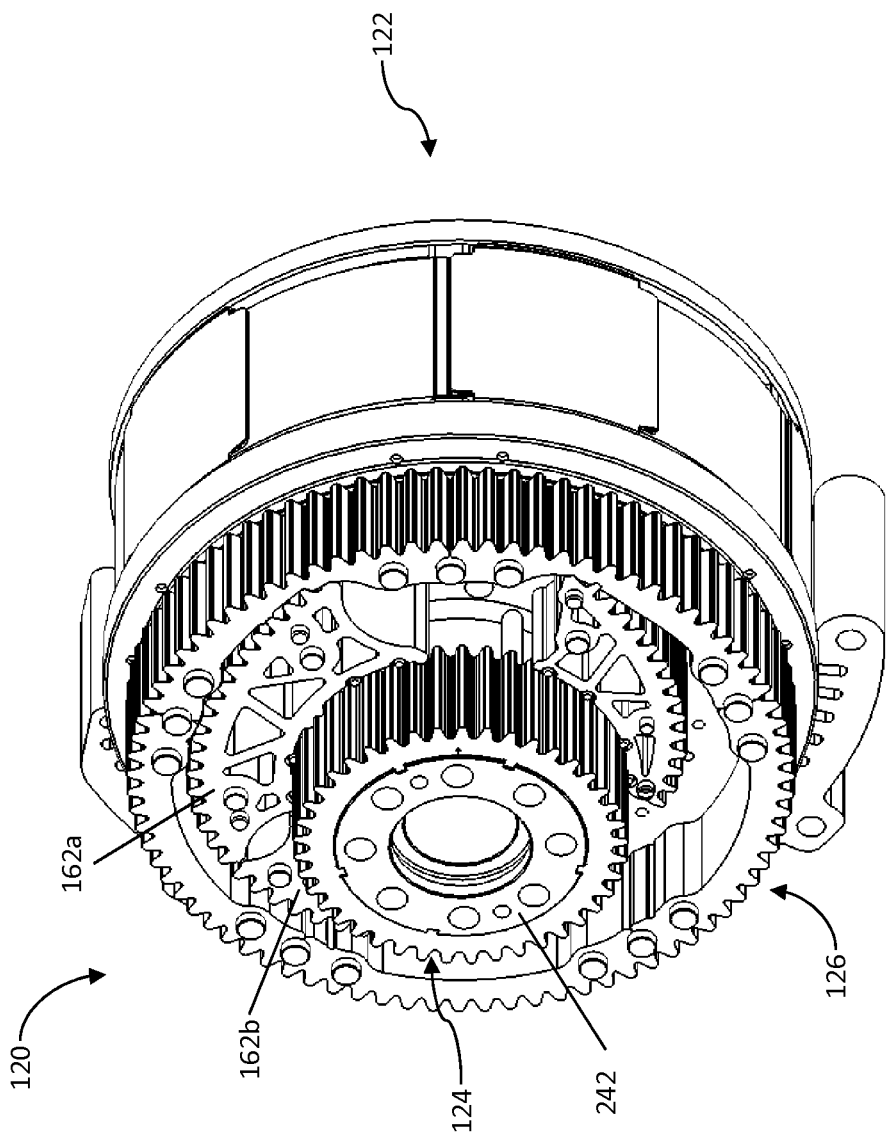

At the steps shown in FIGS. 8h and 8i, the second transition segments 162a, 162b are sequentially moved out of the engaged region while individually positioned in the non-contact zone of the pulley assembly 120. Accordingly, as the pulley assembly 120 rotates the second transition segments 162a, 162b will avoid and will not engage the endless member 118. Once the second transition segments 162a, 162b are moved out of the engaged region, the pulley assembly 120 can operate continuously with the endless member 118 engaging the first pulley 124 and the shift event from the second pulley 126 to the first pulley 124 is complete.

Figure 9:
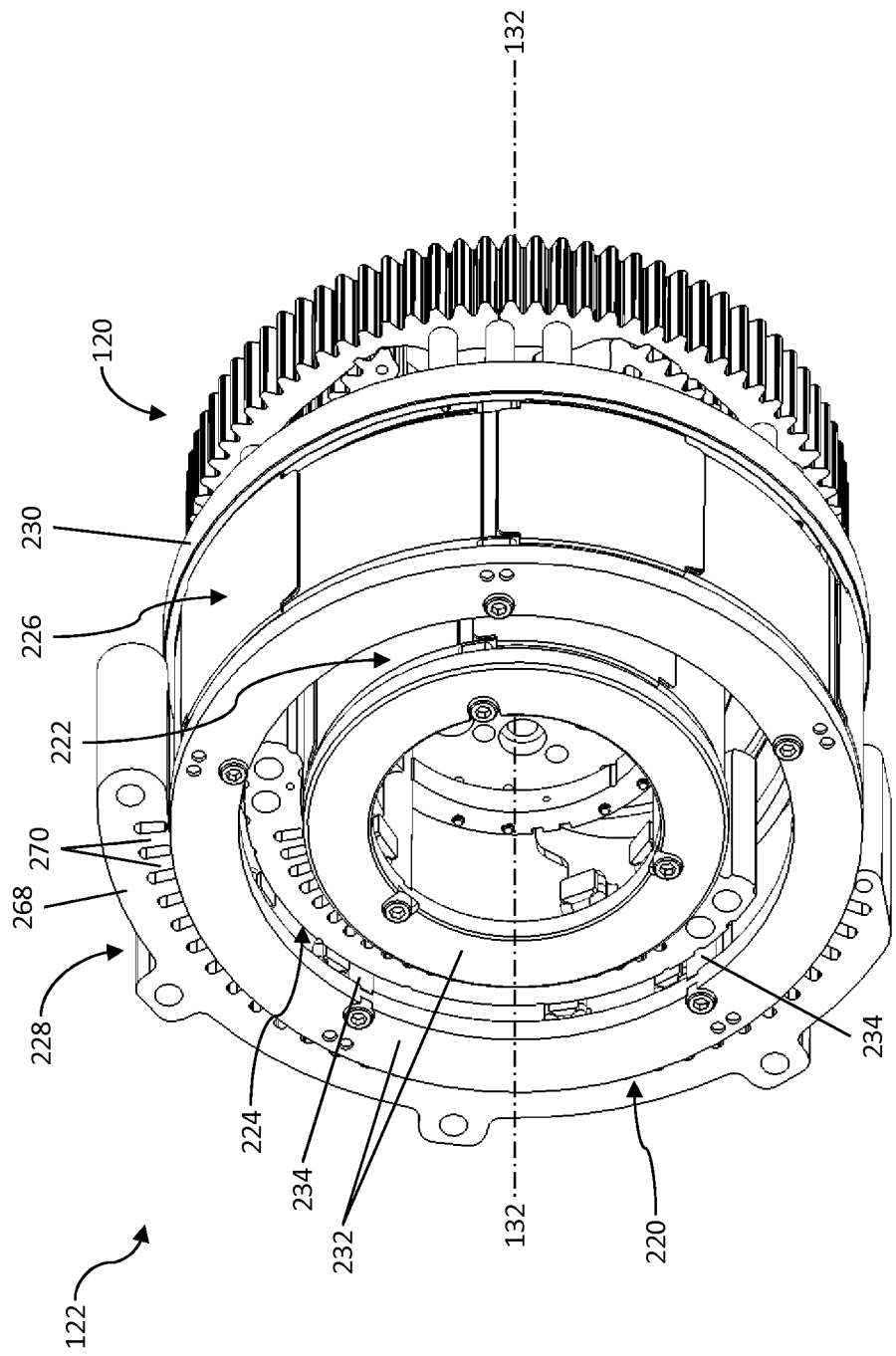
FIG. 9 is an inverted rear, right side view of the pulley assembly and actuator system of FIG. 2.
Figure 10:
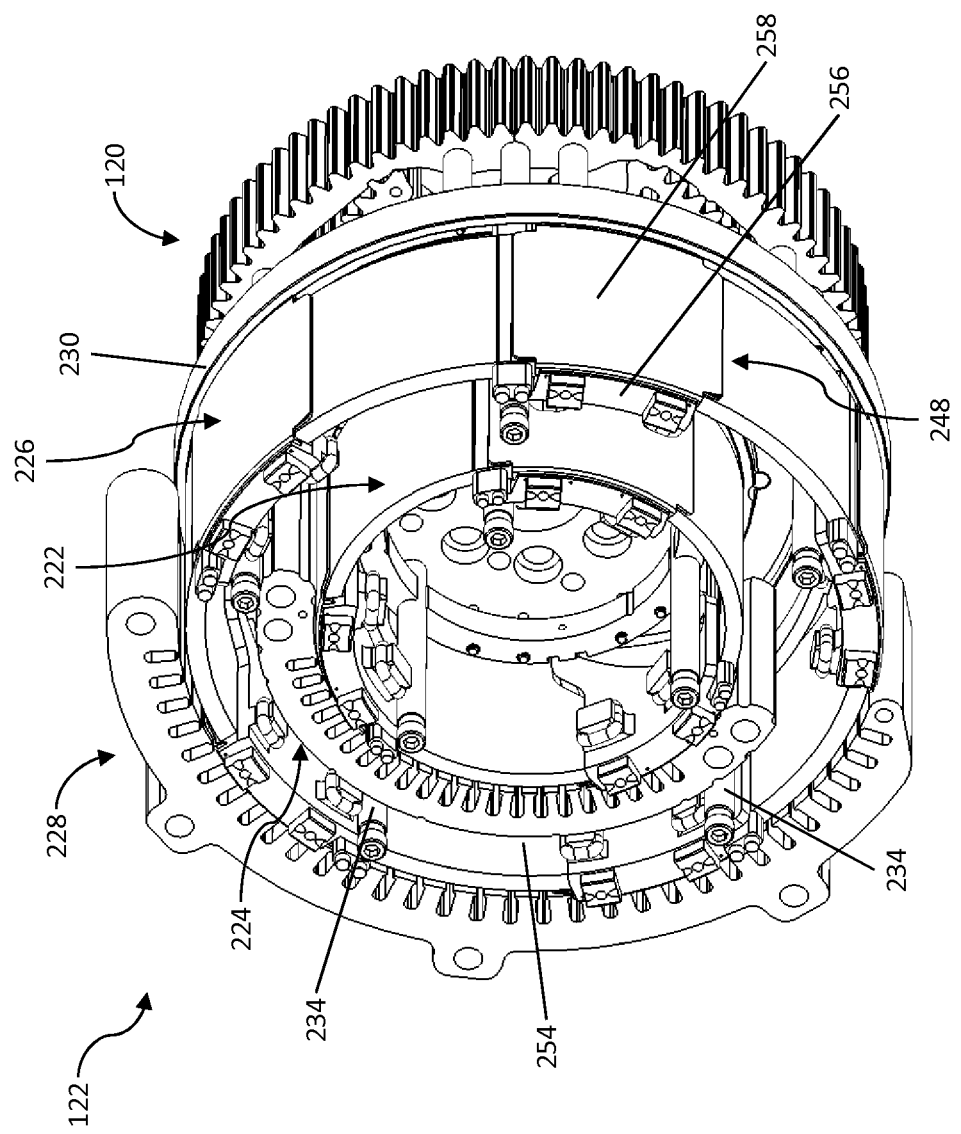
FIG. 10 is an inverted rear, right side view of the pulley assembly and actuator system of FIG. 2, with a pair of backing plates hidden for visibility.

FIGS. 9 and 10 show the actuator system 122 and the pulley assembly 120. The pulley assembly 120 is secured to the actuator system 122, and the actuator system 122 is configured to move the pulley/transition segments 146a to 146e, 152, 162a, 162b of the pulley assembly 120 between the engaged region and the disengaged region. The actuator system 122 comprises a support structure 220, a first actuator subassembly 222, a first stator 224, a second actuator subassembly 226 and a second stator 228. As described herein, the actuator system 122 and the pulley assembly 120 can be secured within the segmented pulley transmission 110.

The support structure 220 is rotatable and is configured to support and couple the first actuator subassembly 222 and the second actuator subassembly 226 to a rotatable element in the segmented pulley transmission 110, such as the driven axle or the driving axle (not shown). In the subject embodiment, the support structure 220 is further, configured to support and couple the pulley assembly 120 to the rotatable element of the segmented pulley transmission 110. In other embodiments, the pulley assembly 120 or a portion thereof (such as the first pulley 124) may be directly coupled to the rotatable element of the segmented pulley transmission 110. The support structure 220 comprises a hub 230, a pair of retaining rings 232 and a plurality of support rods 234 secured between the hub 230 and the retaining rings 232.

Figure 11A:
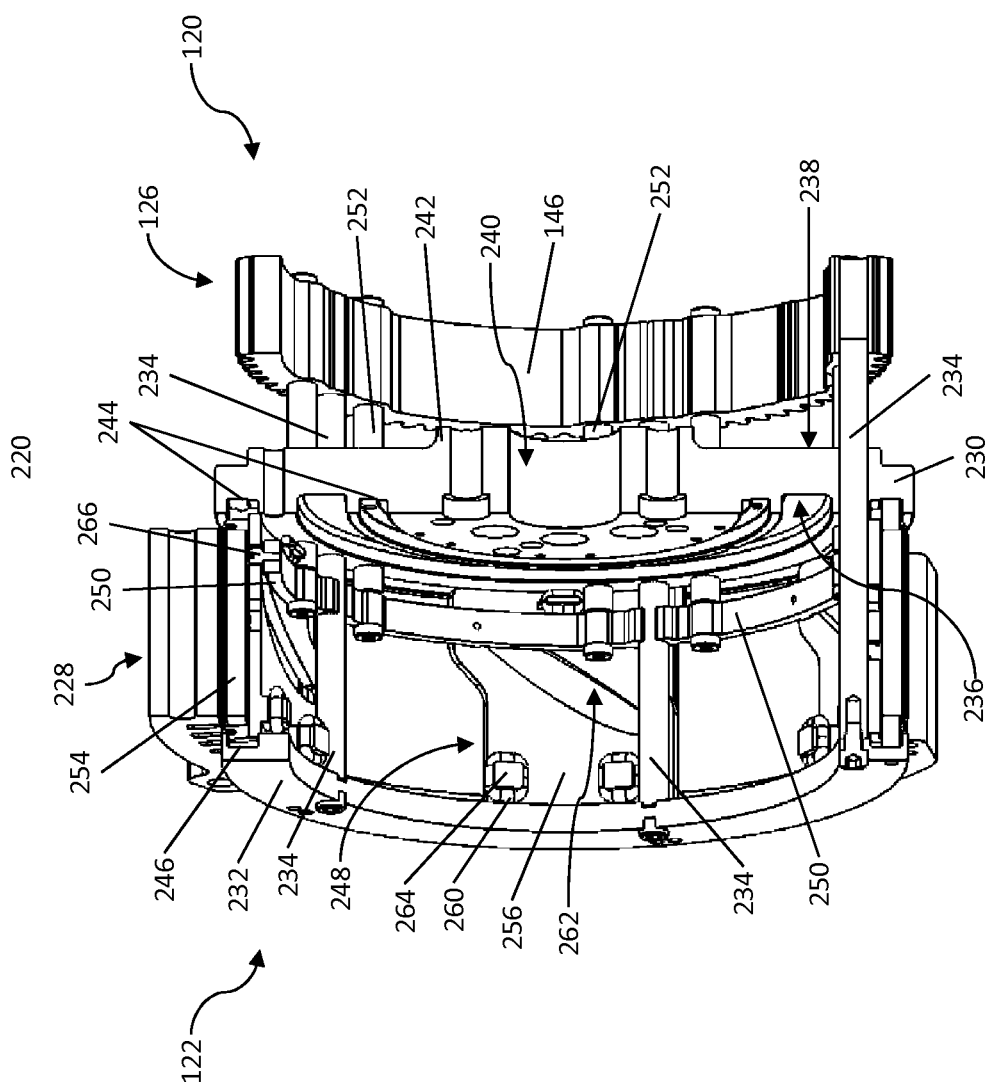
FIGS. 11a to 11c are cross-sectional views of the pulley assembly and actuator system of FIG. 2 showing a sequence for retracting a segment of the pulley assembly, with obstructing elements hidden for visibility.

The hub 230 is configured to be secured to the axle of the segmented pulley transmission 110 and supports the first actuator subassembly 222 and the second actuator subassembly 226. The hub 230 comprises a circular disk having an actuator side 236 and an opposite pulley side 238. A central passage 240 is defined within the hub 230 and extends from the actuator side 236 to the pulley side 238. The central passage 240 is configured to securely receive the axle of the segmented pulley transmission 110 and is concentric with the axis of rotation 132. The hub 230 is further configured to secure the first pulley 124 of the pulley assembly 120 to the axle of the segmented pulley transmission 110. Accordingly, the hub 230 includes an axial projection 242 that extends from the pulley side 238 of the hub 230 and is configured to secure the first pulley 124, as shown in FIG. 8i. In some embodiments, the first pulley 124 may be press-fit onto the hub 230. The hub 230 includes a pair of guides 244 on the actuator side 236 thereof. The guides 244 are configured to slidably secure sleds of the first actuator subassembly 222 and the second actuator subassembly 226 and to guide the sleds in a generally circumferential direction, as will be described below. The guides 244 may include raceways defined in the actuator side 236 of the hub 230, as shown in FIG. 11a, or may include other suitable guiding features such as rails or ridges.

The retaining rings 232 support the first actuator subassembly 222 and the second actuator subassembly 226 and are secured to the hub 230 by the support rods 234. The retaining rings 232 are positioned on an opposite side of the actuator subassemblies 222, 226 from the hub 230. Each of the retaining rings includes a guide 246 that is aligned with a corresponding one of the guides 244 in the hub 230. The guides 246 are configured to slidably secure the sleds of the first actuator subassembly 222 and the second actuator subassembly 226 and to guide the sleds in a generally circumferential direction, as will be described below. The guides 246 may include raceways defined in the actuator side 236 of the hub 230, as shown in FIG. 11a, or may include other suitable guiding features such as rails or ridges. Although a plurality of retaining rings are shown, it will be appreciated that in other embodiments the support structure 220 may include a single retaining member that extends across and secures both the first actuator subassembly 222 and the second actuator subassembly 226. The single retaining member may be a single retaining ring extending across both actuator subassemblies 222, 226 or may be a single retaining plate. In such embodiments, the single retaining member may include both of the guides 246.

The support rods 234, which secure the retaining rings 232 to the hub 230, extend from the actuator side 236 of the hub 230 to the retaining rings 232 and are secured therebetween by fasteners or the like. The support rods 234 may further extend through the hub 230 and may be slidably engaged with the pulley/transition segments of the pulley assembly 120, as shown at the bottom of FIG. 11a. Accordingly, the support rods 234 can be configured to guide the pulley/transition segments of the pulley assembly 120 as they move between the engaged region and the disengaged region. Although an individual support rod 234 is shown in FIG. 11a extending from the retaining ring 232, through the hub 230 and to the pulley/transition segments of the pulley assembly 120, in other embodiments separate support rods 234 may extend from the retaining rings 232 to the hub 230 and from the hub 230 to the pulley/transition segments of the pulley assembly 120. Although support rods 234 are shown and described, in other embodiments different suitably shaped support members can be used to secure the retaining rings 232 to the hub 230, such as support beams or bars. In yet other embodiments, the retaining rings 232 may be secured to the hub 230 directly by integrally formed support members.

The first actuator subassembly 222 and the second actuator subassembly 226 are configured to move the pulley/transition segments 146a to 146e, 152, 162a, 162b of the pulley assembly 120 into and out of the engaged region. Specifically, the first actuator subassembly 222 is configured to move the transition segments 152, 162a, 162b of the transition segment sets 128, 130. The second actuator subassembly 226 is configured to move the pulley segments 146a to 146e of the second pulley 126. The first actuator subassembly 222 and the second actuator subassembly 226 are secured to the support structure 220 and each of the actuator subassemblies 222, 226 comprises a plurality of sleds 248, a plurality of followers 250, a plurality of connecting rods 252 and a backing plate 254. The first actuator subassembly 222 and the second actuator subassembly 226 are functionally the same. However, the second actuator subassembly 226 is circumferentially larger than the first actuator subassembly 222 and encircles the first actuator subassembly 222. Accordingly, the second actuator subassembly 226 includes a greater number of sleds 248, followers 250 and connecting rods 252 than the first actuator subassembly 222.

Figure 11B:
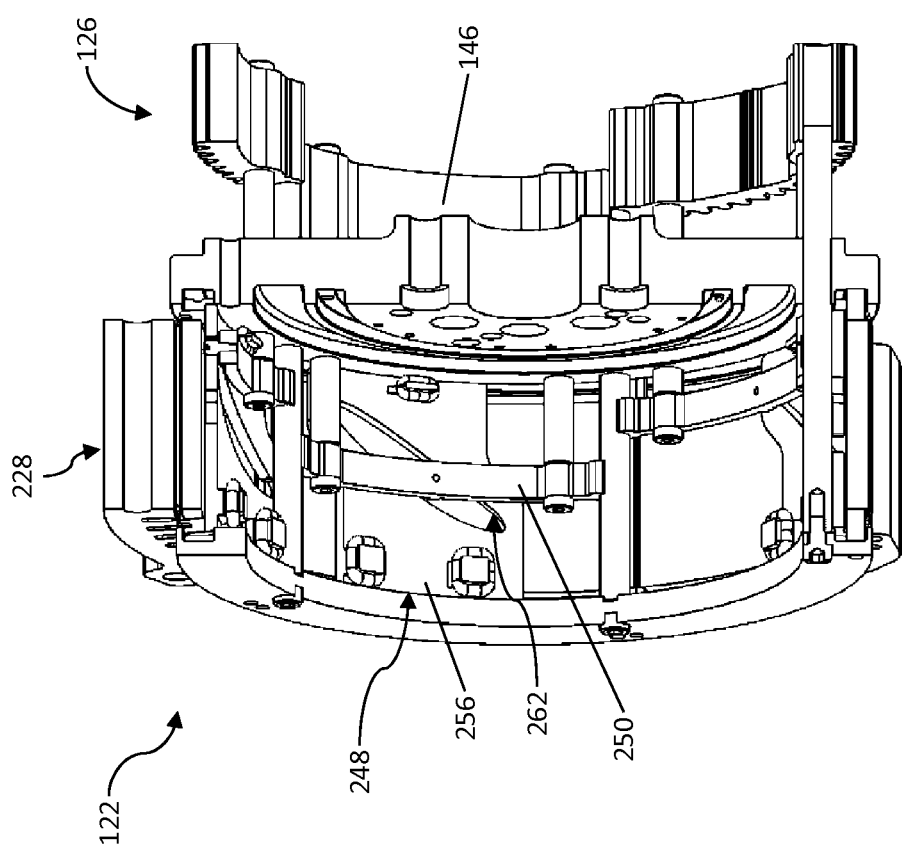
Figure 11C:
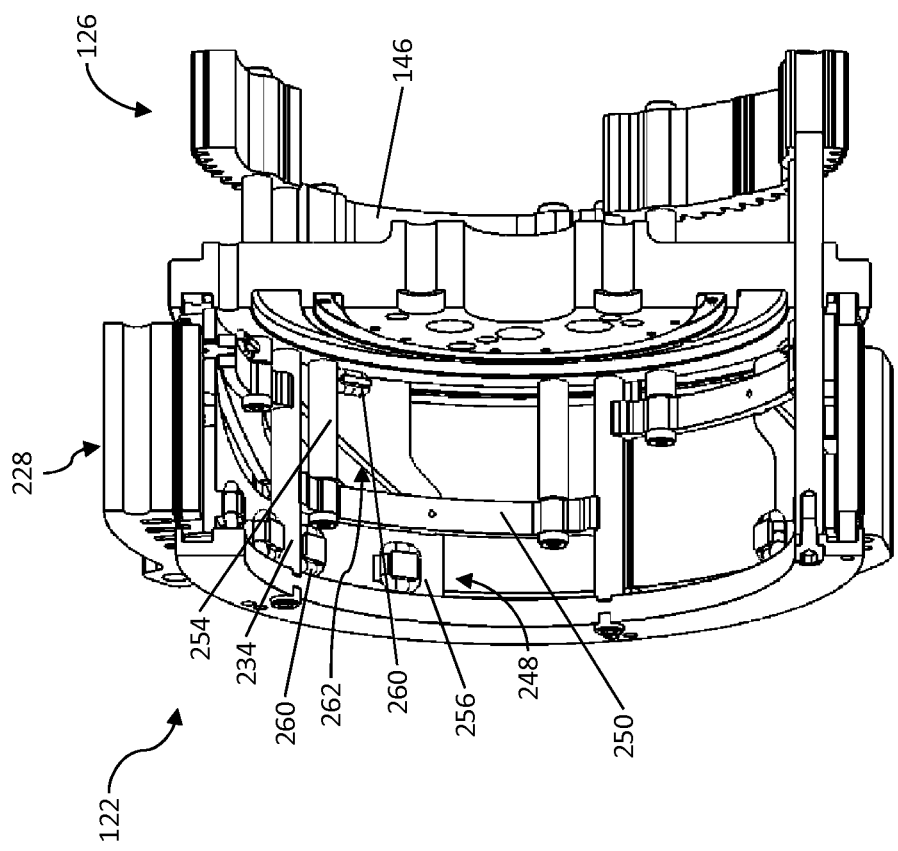

Each of the sleds 248 is movable in a generally circumferential direction about the axis of rotation 132 between a respective retreated position (shown in FIG. 11a) and a respective advanced position (shown in FIG. 11c). As will be appreciated, the generally circumferential direction may extend completely circumferentially, or may extend partially circumferentially and include a radial component. Each of the sleds 248 is coupled to one of the pulley/transition segments 146a to 146e, 152, 162a, 162b of the pulley assembly 120, such that movement of the sled 248 between the retreated position and the advanced position causes the coupled pulley/transition segment to move between the engaged region and the disengaged region, or vice versa. Each of the sleds 248 is configured to be moved between the advanced position and the retreated position in response to an electromotive force generated on the sled 248 as the sled 248 rotationally passes adjacent one of the stators 224, 228. The electromotive force can be induced by temporary magnetic fields generated by the stators 224, 228 as will be described below. In the subject embodiment, each of the sleds 248 surrounds a portion of the backing plate 254 that passes though the sled 248. In other embodiments, the backing plate 254 may pass alongside the sleds 248 or may be omitted entirely.

Each of the sleds 248 comprises a sled chassis 256, a reaction plate 258 and a plurality of bumpers 260. The sled chassis 256 is configured to support and guide the reaction plate 258 and the bumpers 260 as the sled 248 moves between the advanced position and the retreated position. Accordingly, the sled chassis 256 extends between the guides 244, 246 and engages the guides 244, 246 as the sled 248 moves. The sled chassis 256 comprises at least one cam surface 262 for engaging a respective one of the followers 250 as the sled 248 moves between the retreated position and the advanced position. The engagement of the cam surface 262 with the follower 250 converts the generally circumferential movement of the sled 248 into axial movement of the follower 250. The sled chassis 256 further comprises a plurality of posts 264 for securing the bumpers 260 thereon. The sled chassis 256 is formed of a magnetically non-reactive material, such as aluminium or plastic, to reduce potential magnetic interference with the electromotive force generated on the sled 248. Although, in other embodiments, the sled chassis 246 may be formed of a magnetically permeable material to increase the electromagnetic force on the sled 248

The bumpers 260 are configured to impact the support rods 234 and arrest the generally circumferential movement of the sled 248 as it reaches the advanced position or the retreated position. In this manner, the support rods 234 of the support structure 220 can act as stops for the sled 248. In other embodiments, the support structure 220 can include other suitable stops located adjacent each of the advanced and retreated positions to arrest movement of the sled in the generally circumferential direction. The bumpers 260 are formed of rubber or other suitable material to dampen the impact with the support rods 234 and may be formed as O-rings or other suitable shapes. As will be appreciated, in some embodiments the bumpers 260 may be omitted and the sleds 248 may directly impact the support rods 234 to arrest the movement of the sleds 248 in the generally circumferential direction.

The reaction plate 258 is configured to increase the electromotive force on the sled 248 generated by the temporary magnetic fields of the adjacent first or second stator 224, 228. The reaction plate 258 is formed of material that is electrically conductive but magnetically inert, such as copper, gold or aluminum. The reaction plate 258 is secured to the sled chassis 256 and is positioned on an outer peripheral surface of the sled 248. Accordingly, the reaction plate 258 will be brought into proximity with the adjacent stator 224, 228, as the actuator subassembly 222, 226 rotates about the axis of rotation 132 and through the non-contact zone of the pulley assembly 120. In other embodiments, the reaction plate 258 may form the inner peripheral surface of the sled 248, or another suitable surface of the sled 248 that will be brought into proximity with the adjacent stator 224, 228 during rotational operation of the actuator subassembly 222, 226. In yet other embodiments the reaction plate 258 may be omitted entirely and the sled chassis 256 may be configured to generate sufficient electromotive force to move the sled 248 when exposed to the temporary magnetic fields of the adjacent first or second stator 224, 228.

Each of the followers 250 is configured to transfer the generally circumferential movement of a respective one of the sleds 248 into axially movement of a respective one of the pulley/transition segments of the pulley assembly 120. Accordingly, each of the followers 250 is engageable with a cam surface 262 of the respective one of the sleds 248 and is securable to the respective one of the pulley/transition segments 146a to 146e, 152, 162a, 162b. Each of the followers 250 includes a protrusion 266 that is engageable with the cam surface 262 of the respective sled 248. As the sled 248 moves between the advanced position and the retreated position, the cam surface 262 engages the protrusion 266 and slides the follower 250 between a retracted position (shown in FIG. 11c) and an extended position (shown in FIG. 11a). In the subject embodiment, each of the followers 250 is secured to the respective one of the pulley/transition segments 146a to 146e, 152, 162a, 162b of the pulley assembly 120 by one or more connecting rods 252. Accordingly, as the follower 250 moves between the extended position and the retracted position, the respective one of the pulley/transition segments 146a to 146e, 152, 162a, 162b will move between the engaged region and the disengaged region. In other embodiments, each of the followers 250 may be secured to the respective one of the pulley/transition segments 146a to 146e, 152, 162a, 162b directly, such as by an integrally formed connecting rod extending from either the follower 250 or the respective segment and extending therebetween.

The plurality of connecting rods 252 secure the followers 250 to the pulley/transition segments 146a to 146e, 152, 162a, 162b of the pulley assembly 120, such that each of the pulley/transition segments 146a to 146e, 152, 162a, 162b is coupled to one of the followers 250 and is moved between the engaged region and the disengaged region as the coupled follower 250 moves between the extended position and the retracted position. Accordingly, each of the connecting rods 252 is secured to one of the pulley/transition segments 146a to 146e, 152, 162a, 162b and a corresponding one of the followers 250. Each of the connecting rods 252 extends from one the coupled follower 250 on the actuator side 246 of the hub 230, through the hub 230 and to the coupled segment 146a to 146e, 152, 162a, 162b on the pulley side 238 of the hub 230. In the subject embodiment, a plurality of connecting rods 252 are coupled between each of the followers 250 and the corresponding one of the pulley/transition segments 146a to 146e, 152, 162a, 162b. In other embodiments, a single connecting rod 252 may be coupled between each of the followers 250 and the corresponding one of the pulley/transition segments 146a to 146e, 152, 162a, 162b. In yet other embodiments, the connecting rods 252 may be omitted entirely and each of the followers 250 may be secured to the respective one of the pulley/transition segments 146a to 146e, 152, 162a, 162b directly, such as by an integrally formed connecting rod extending from either the follower 250 or the respective segment and extending therebetween.

The backing plate 254 is configured to increase the electromotive force on the sleds 248 generated by the temporary magnetic fields of the stators 224, 228. The backing plate 254 is formed of a magnetically permeable material, such as copper, gold or aluminium. Although, in other embodiments, the backing plate 254 can be formed of other suitable materials, such as mild steel, silicon steel, motor steel, ceramics and/or powdered metals, The backing plate 254 is secured between the hub 230 and a respective one of the retaining rings 232 of the support structure 220 and rotates therewith. In some embodiments, there may be a small gap between the backing plate 254 and the sleds 248 to avoid interference with the sleds 248 during generally circumferential movement thereof. In other embodiments, the sleds 248 may be in contact with the backing plate 254 to increase the electromotive force generated on the sleds 248. In yet other embodiments, the backing plate 254 may be omitted entirely and the sleds 248 may be designed to generate sufficient electromotive force to move between their advanced and retreated positions when exposed to the temporary magnetic field of the first or second stator 224, 228, without amplification by the backing plate 254.

The first stator 224 and the second stator 228 are energizable to generate the temporary magnetic fields to move the sleds 248 of the first actuator subassembly 222 and the second actuator subassembly 226 between their individual advanced and retreated positions. As will be appreciated, the first stator 224 is configured to generate the temporary magnetic fields to move the sleds 248 of the first actuator assembly 222, and the second stator 228 is configured to generate the temporary magnetic fields to move the sleds 248 of the second actuator subassembly 226. Each of the stators 224, 228 comprises a stator core 268 that circumferentially extends across at least a portion of the non-contact zone of the pulley assembly 120 and includes a plurality of teeth 270 extending radially therefrom. Each of the stators 224, 228 further comprises a plurality of windings (not shown) surrounding the teeth 270. The windings of each of the stators 224, 228 are selectively energizable to generate the temporary magnetic fields over a portion of the stator 224, 228, or over the entire span of the stator 224, 228. The windings of the stators 224, 228 can be energized to move the sleds 248 of the actuator subassemblies 222, 226, as the sleds 248 pass adjacent the stators 224, 228 and through the non-contact zone of the pulley assembly 120. Accordingly, the first stator 224 borders a portion of the first actuator assembly 222 in the non-contact zone, and the second stator 228 borders a portion of the second actuator subassembly 226 in the non-contact zone. The first stator 224 and the second stator 228 are fixed to the housing 112 of the segmented pulley transmission 110 and do not rotate with the first and second actuator subassemblies 222, 226.

FIGS. 11a to 11c show a sequence for moving one of the pulley segments of the second pulley 126 from the engaged region to the disengaged region during rotation operation of the pulley assembly 120 and the actuator system 122. As will be appreciated, this sequence can be reversed to move the pulley segment from the disengaged region to the engaged region. The pulley segment being moved in FIGS. 11a to 11c is generically identified by reference character 146. As will be appreciated, the pulley segment 146 could be any one of the pulley segments 146a to 146e of the second pulley 126. The elements visually obstructing the second actuator subassembly 226 and the second pulley 126 in FIGS. 11a to 11c have been hidden; for example, the first actuator subassembly 222, the first stator 224, the first pulley 124 and the axial projection 242 of the hub 230 have all been hidden.

At the step shown in FIG. 10a, the pulley segment 146 is in the engaged region, the follower 250 coupled to the pulley segment 146 is in the extended position and the sled 248 coupled to the follower 250 is in the retreated position. To move the pulley segment 146 to the disengaged region, the second stator 228 is selectively energized to generate a temporary magnetic field as the sled 248 rotationally passes in proximity to the second stator 228 and through the non-contact zone of the pulley assembly 120. As described above, the winding of the second stator 228 may be selectively energized to generate the temporary magnetic field. The temporary magnetic field generated by the second stator 228 induces a current in the sled 248 (such as in the reaction plate 258 and/or in the sled chassis 256) and the induced current interacts with the temporary magnetic field to generate an electromotive force on the sled 248 that propels the sled 248 from the retreated position to the advanced position. As will be appreciated, the direction and location of the temporary magnetic field can be altered by changing which windings of the second stator 228 are energized and the direction of the current passing through the windings.

At the step shown in FIG. 11b, the electromotive force causes the sled 148 to move from the retreated position towards the advanced position. The sled 248 engages the guides 244, 246 as it moves and is guided in the generally circumferential direction by the guides 244, 246. As the sled 148 moves generally circumferentially from the retreated position towards the advanced position, the cam surface 262 on the sled 248 engages the protrusion 266 on the follower 250 and causes the follower 250 to move axially from the extended position towards the retracted position. This axial movement of the follower 250 is conveyed through the connecting rods 252 to the coupled pulley segment 146 and causes the pulley segment 146 to move from engaged region towards the disengaged region.

At the step shown in FIG. 11c, one of the bumpers 260 impacts a rotationally preceding one of the support rods 234 and arrests movement of the sled 248 at the advanced position. Additionally or alternatively, one of the bumpers 260 may impact a rotationally preceding one of the connecting rods 252 to arrest circumferential movement of the sled 248. In this manner, the support rods 234 and/or the connecting rods 252 may act as stops to arrest the movement of the sled 148 at the advanced position. The cam surface 262 of the sled 248 is configured such that when the sled 148 is in the advanced position, the coupled follower 250 is in the retracted position and the coupled pulley segment 146 is out of the engaged region and in the disengaged region.

Although the above sequence is described with respect to the second stator 228 and for moving one of the pulley segments 146 of the second pulley 126, it will be appreciated that each of the transition segments 152, 162 of the transition segment sets 128, 130 are moved between the engaged region and the disengaged region by energizing the first stator 224 in a similar sequence.

Although the actuator system 122 has been shown and described herein as moving the pulley/transition segments 146a to 146e, 152, 162a, 162b of the pulley assembly 120 in the segmented pulley transmission 110, it will be appreciated that in other embodiments the actuator system 122 can be used to bi-directionally move discrete rotating elements of another working system, such as seal segments in a downhole drilling system.

Although the pulley system 120 has been shown and described herein as comprising two concentric pulleys, the first pulley 124 and the second pulley 126, it will be appreciated that in other embodiments the pulley system may comprise a greater plurality of concentric pulleys when further ratios for the segmented pulley transmission 110 are desired.

Although the pulley system 120 has been shown and described herein as comprising two transition segment sets, the first transition segment set 128 and the second transition segment set 130, it will be appreciated that in other embodiments the pulley assembly may comprise only one transition segment set interposed between immediately neighbouring pulleys. A single transition segment set may be interposed between immediately neighbouring pulleys, for example when a smooth transition is only required during an upshift event, or during a downshift event, but not during both.

Although embodiments of a pulley assembly and an actuator system for a segmented pulley transmission have been described, other aspects thereof have been considered according to the following clauses:

Clause 1. A pulley assembly for engaging an endless member of a segmented pulley transmission, the pulley assembly comprising:
- a first pulley having an outer peripheral surface for engaging the endless member;
- a second pulley configured to concentrically surround the first pulley and having an outer peripheral surface for engaging the endless member, the second pulley comprising a set of second pulley segments, each second pulley segment being independently movable between an engaged region where the second pulley segment is in the path of the endless member and a disengaged region where the second pulley segment is offset from the path of the endless member; and
- at least one transition segment set comprising one or more transition segments, which define at least one transition surface, that are independently movable to the engaged region to engage and transition the endless member between the first pulley and the second pulley.

Clause 2. The pulley assembly of clause 1, wherein the at least one transition segment set is interposed between the first pulley and the second pulley when located in the engaged region therewith.

Clause 3. The pulley assembly of clause 1 or 2, wherein the at least one transition segment set comprises a first transition segment set that is configured to transition the endless member from the first pulley to the second pulley and wherein the at least one transition surface comprises a first transition surface defined by the first transition segment set.

Clause 4. The pulley assembly of clause 3, wherein the first transition surface has a leading portion that is generally aligned with a first adjacent portion of the first pulley.

Clause 5. The pulley assembly of clause 3 or 4, wherein the first transition surface has a trailing portion that is generally aligned with a first adjacent portion of the second pulley.

Clause 6. The pulley assembly of any one of clauses 3 to 5, wherein the first transition segment set comprises only a single first transition segment.

Clause 7. The pulley assembly of any one of clauses 1 to 6, wherein the at least one transition segment set comprises a second transition segment set that is configured to transition the endless member from the second pulley to the first pulley and wherein the at least one transition surface comprises a second transition surface defined by the second transition segment set.

Clause 8. The pulley assembly of clause 7, wherein the second transition surface has a leading portion that is generally aligned with a second adjacent portion of the second pulley.

Clause 9. The pulley assembly of clause 7 or 8, wherein the second transition surface has a trailing portion that is generally aligned with a second adjacent portion of the first pulley.

Clause 10. The pulley assembly of any one of clauses 7 to 9, wherein the second transition segment set comprises a plurality of second transition segments.

Clause 11. The pulley assembly of any one of clauses 1 to 10, wherein at least one of the transition surfaces extends from adjacent the first pulley to adjacent the second pulley, over a partial turn about the axis of rotation.

Clause 12. The pulley assembly of any one of clauses 1 to 11, wherein at least one of the transition surfaces follows a smooth generally spiral path about the axis of rotation.

Clause 13. The pulley assembly of any one of claims 1 to 12, further comprising an actuator system coupled to the set of second pulley segments and the at least one transition segment set, wherein the actuator system is configured to independently move the set of second pulley segments and the at least one transition segment set between the engaged region and the disengaged region.

Clause 14. The pulley assembly of claim 13, wherein the actuator system is configured to independently move the set of second pulley segments and the at least one transition segment set between the engaged region and the disengaged region using an electromotive force.

Clause 15. An actuator system for moving discrete rotating elements of a working system, the actuator system comprising:
- a support structure rotatably securable to the working system about an axis of rotation;
- at least one actuator subassembly secured to the support structure and comprising:
  - at least one sled movable with respect to the support structure between a respective advanced position and a respective retreated position, in response to an electromotive force generated on the sled by a temporary magnetic field; and
  - at least one follower engageable with the at least one sled to move between a respective extended position and a respective retracted position as the at least one sled moves between the respective advanced position and the respective retreated position, the follower being securable to one or more of the discrete rotating elements of the working system; and
- at least one stator fixedly securable to the working system in a position bordering the at least one actuator subassembly, the stator being selectively energizable to generate the temporary magnetic field.

Clause 16. The actuator system of clause 15, wherein the at least one actuator subassembly further comprises a backing plate positioned in proximity to the at least one sled to increase the electromotive force generated on the sled by the temporary magnetic field.

Clause 17. The actuator system of clause 16, wherein the backing plate is secured to the support structure and extends in a generally circumferential direction.

Clause 18. The actuator system of clause 17, wherein the backing plate passes through the at least one sled.

Clause 19. The actuator system of any one of clauses 15 to 18, wherein the support structure includes a pair of guides and the at least one sled is slidably secured therebetween to guide the at least one sled as the sled moves between the respective advanced position and the respective retracted position.

Clause 20. The actuator system of any one of clauses 15 to 19, wherein each of the at least one sleds comprises a sled chassis and a reaction plate secured to the sled chassis, and wherein the reaction plate is formed of an electrically conductive but magnetically inert material to increase the electromotive force generated on the sled.

Clause 21. The actuator system of any one of clauses 15 to 20, wherein the support structure includes at least one stop to arrest movement of the at least one sled at the respective advanced and the retreated positions.

Clause 22. The actuator system of clause 21, wherein the at least one sled comprises at least one bumper for impacting the stops to arrest the movement of the at least one sled at the respective advanced and the retreated positions.

Clause 23. The actuator system of any one of clauses 15 to 22, wherein each of the at least one stators comprises a stator body and at least one winding that is selectively energizable to generate the temporary magnetic field.

Clause 24. The actuator system of any one of clauses 15 to 23, wherein the at least one follower comprises a protrusion that is engageable with a cam surface of the at least one sled to move the follower between the respective extended position and the respective retracted position as the at least one sled moves between the respective advanced position and the respective retreated position.

Clause 25. The actuator system of any one of clauses 15 to 24, wherein the discrete rotating elements of the working system are segments of the set of second pulley segments and the at least one transition segment set of the pulley assembly as defined in any one of clauses 1 to 14.

Although embodiments have been described above and are shown in the accompanying drawings, it will be appreciated by those skilled in the art that variations and modifications may be made without departing from the scope as defined by the appended claims, and the scope of the claims should be given the broadest interpretation consistent with the specification as a whole.

What is claimed is:

1. A pulley assembly for engaging an endless member of a segmented pulley transmission, the pulley assembly comprising:
   a first pulley rotatable about an axis of rotation and having an outer peripheral surface for engaging the endless member;
   a second pulley configured to concentrically surround the first pulley and having an outer peripheral surface for engaging the endless member, the second pulley comprising a set of second pulley segments that are independently movable between an engaged region and a disengaged region; and
   at least one transition segment set comprising one or more transition segments that are independently movable between the engaged region and the disengaged region to transition the endless member between the first pulley and the second pulley, the at least one transition segment set defining at least one transition surface for engaging and transitioning the endless member between the first pulley and the second pulley.

2. The pulley assembly of claim 1, wherein the at least one transition segment set is interposed between the first pulley and the second pulley when located in the engaged region therewith.

3. The pulley assembly of claim 1, wherein the at least one transition segment set comprises a first transition segment set that is configured to transition the endless member from the first pulley to the second pulley and wherein the at least one transition surface comprises a first transition surface defined by the first transition segment set.

4. The pulley assembly of claim 3, wherein the first transition surface has a leading portion that is generally aligned with a first adjacent portion of the first pulley and wherein the first transition surface has a trailing portion that is generally aligned with a first adjacent portion of the second pulley.

5. The pulley assembly of claim 3, wherein the first transition segment set comprises only a single first transition segment.

6. The pulley assembly of claim 1, wherein the at least one transition segment set comprises a second transition segment set that is configured to transition the endless member from the second pulley to the first pulley and wherein the at least one transition surface comprises a second transition surface defined by the second transition segment set.

7. The pulley assembly of claim 6, wherein the second transition surface has a leading portion that is generally aligned with a second adjacent portion of the second pulley and wherein the second transition surface has a trailing portion that is generally aligned with a second adjacent portion of the first pulley.

8. The pulley assembly of claim 6, wherein the second transition segment set comprises a plurality of second transition segments.

9. The pulley assembly of claim 1, wherein at least one of the transition surfaces extends from adjacent the first pulley to adjacent the second pulley, over a partial turn about the axis of rotation.

10. The pulley assembly of claim 1, wherein at least one of the transition surfaces follows a smooth generally spiral path about the axis of rotation.

11. A method for shifting an endless member over a pulley assembly during rotational operation thereof, the method comprising:
    engaging the endless member with an origin pulley of the pulley assembly;
    positioning a transition segment set of the pulley assembly in an engaged region, the transition segment set extending between the origin pulley and a destination pulley of the pulley assembly;
    rotating the pulley assembly to engage the endless member with the transition segment set;
    transitioning the endless member from adjacent the origin pulley to adjacent the destination pulley, over a partial turn of the pulley assembly about an axis of rotation thereof;
    positioning the destination pulley in the engaged region;
    rotating the pulley assembly to engage the endless member with the destination pulley;
    disengaging the endless member from the origin pulley; and
    disengaging the endless member from the transition segment set.

12. The method of claim 11, further comprising moving the transition segment set out of the engaged region after disengaging the endless member from the transition segment set and moving a different transition segment set into the engaged region in preparation for a subsequent shift event.

13. The method of claim 11, further comprising moving the transition segment set out of the engaged region after the partial turn of the pulley assembly and before a full rotation thereof.

14. An actuator system for moving discrete rotating elements of a working system, the actuator system comprising:
    a support structure rotatably securable to the working system about an axis of rotation;
    an actuator subassembly secured to the support structure and comprising:
        a sled movable with respect to the support structure in a generally circumferential direction about the axis of rotation between an advanced position and a retreated position, in response to an electromotive force generated on the sled by a temporary magnetic field, the sled defining a cam surface; and a follower engageable with the cam surface to move in a generally axial direction between an extended position and a retracted position as the sled moves between the advanced position and the retreated position, the follower being securable to one or more of the discrete rotating elements of the working system; and a stator fixedly securable to the working system in a position bordering the actuator subassembly, the stator being selectively energizable to generate the temporary magnetic field to move the sled between the advanced position and the retreated position.

15. The actuator system of claim 14, wherein the actuator subassembly further comprises a backing plate positioned in proximity to the sled to increase the electromotive force generated on the sled by the temporary magnetic field and wherein the backing plate passes through the sled.

16. The actuator system of claim 14, wherein the sled comprises a sled chassis and a reaction plate secured to the sled chassis, and wherein the reaction plate is formed of an electrically conductive but magnetically inert material to increase the electromotive force generated on the sled.

17. The actuator system of claim 14, wherein the support structure includes at least one stop to arrest movement of the sled in the generally circumferential direction at the advanced and the retreated positions.

18. The actuator system of claim 14, wherein the stator comprises a stator body and at least one winding that is selectively energizable to generate the temporary magnetic field.

19. A method moving a discrete rotating element of a working system, the method comprising:

energizing a stator to generate a temporary magnetic field;

moving a sled between a retreated position and an advanced position using an electromotive force induced by the temporary magnetic field;

engaging a follower with a cam surface of the sled to move the follower between an extend position and a retreated position; and securing the follower to the discrete rotating element of the working system to move the discrete element with the follower.

20. The method of claim 19, wherein the sled moves in a generally circumferential direction between the retreated position and the advanced position and wherein the follower moves in an axial direction between the extended position and the retreated position.

21. A segmented pulley transmission comprising:

a housing;

a first rotatable member secured within the housing;

a pulley assembly as defined in claim 1 coupled to the first rotatable member;

an actuator system as defined in claim 14 connected to the pulley assembly and configured to move at least one segment of the pulley assembly;

a second rotatable member secured within the casing and spaced apart from the first rotatable member; and an endless member coupling the first and second rotatable members and extending therebetween.

22. The segmented pulley transmission of claim 21, wherein the housing comprises one of a generally closed casing and a generally open support structure.

\* \* \* \* \*